United States Patent
Brandhorst, Jr. et al.

(10) Patent No.: US 12,084,353 B2
(45) Date of Patent: Sep. 10, 2024

(54) PRODUCTION OF GREEN AMMONIA FROM THERMOLYZER GAS

(71) Applicant: CHZ TECHNOLOGIES, LLC, Austintown, OH (US)

(72) Inventors: Henry W. Brandhorst, Jr., Auburn, AL (US); Ullrich H. Engel, Camberg (DE); Charles T. Ludwig, Auburn, AL (US); Ernest J. Zavoral, Sr., Canfield, OH (US)

(73) Assignee: CHZ TECHNOLOGIES, LLC, Austintown, OH (US)

( * ) Notice: Subject to any disclaimer, the term of this patent is extended or adjusted under 35 U.S.C. 154(b) by 0 days.

(21) Appl. No.: 18/245,407

(22) PCT Filed: Sep. 15, 2021

(86) PCT No.: PCT/US2021/050485
§ 371 (c)(1),
(2) Date: Mar. 15, 2023

(87) PCT Pub. No.: WO2022/060852
PCT Pub. Date: Mar. 24, 2022

(65) Prior Publication Data
US 2023/0357031 A1    Nov. 9, 2023

Related U.S. Application Data

(60) Provisional application No. 62/706,873, filed on Sep. 15, 2020.

(51) Int. Cl.
*C01C 1/04* (2006.01)
*B01D 53/02* (2006.01)
(Continued)

(52) U.S. Cl.
CPC ............ *C01C 1/0417* (2013.01); *B01D 53/02* (2013.01); *B01D 53/229* (2013.01); *B09B 3/40* (2022.01);
(Continued)

(58) Field of Classification Search
CPC .... C01C 1/0417; B01D 53/02; B01D 53/229; B01D 2256/16; B09B 3/40;
(Continued)

(56) References Cited

U.S. PATENT DOCUMENTS 9,816,033 B2 * 11/2017 Brandhorst, Jr. ....... C10B 47/44
9,828,553 B2    11/2017 Wheeler
(Continued)

FOREIGN PATENT DOCUMENTS

DE    20001920 U1    5/2000
DE    10065921 A1    7/2001
(Continued)

OTHER PUBLICATIONS

Mun et al. Air gasification of railroad wood ties treated with creosote: Effects of additives and their combination on the removal of tar in a two-stage gasifier Fuel 102 (2012) 326-332 (Year: 2012).*
(Continued)

*Primary Examiner* — Daniel Berns
*Assistant Examiner* — Syed T Iqbal
(74) *Attorney, Agent, or Firm* — McKee, Voorhees & Sease, PLC

(57) ABSTRACT

Clean, safe, and efficient methods, systems, and processes for utilizing thermolysis methods to processes to convert various waste sources into a Clean Fuel Gas, Char, and Biochar are provided. The process further converts the Clean Fuel Gas into both a purified hydrogen source for green ammonia production and natural gas. The methods process waste sources to effectively separate, neutralize and/or
(Continued)

destroy halogens and other hazardous components to provide a Clean Fuel Gas, Char and/or Biochar, which can then further be processed to extract and purify hydrogen for green ammonia production from the Clean Fuel Gas and thereby provide natural gas. The Clean Fuel Gas is a natural and renewable natural gas as it is continually produced and further available for use to provide energy and new products.

17 Claims, 4 Drawing Sheets

(51) Int. Cl.
| | |
|---|---|
| *B01D 53/22* | (2006.01) |
| *B09B 3/40* | (2022.01) |
| *B09B 101/75* | (2022.01) |
| *B09B 101/80* | (2022.01) |
| *B09B 101/85* | (2022.01) |
| *C01B 3/02* | (2006.01) |
| *C01B 3/50* | (2006.01) |
| *C01B 3/56* | (2006.01) |
| *C10B 53/00* | (2006.01) |
| *C10B 53/02* | (2006.01) |
| *C10B 53/07* | (2006.01) |
| *C10B 57/02* | (2006.01) |
| *C10J 3/00* | (2006.01) |
| *C10K 3/00* | (2006.01) |

(52) U.S. Cl.
CPC ............... *C01B 3/02* (2013.01); *C01B 3/501* (2013.01); *C01B 3/56* (2013.01); *C10B 53/00* (2013.01); *C10B 53/02* (2013.01); *C10B 53/07* (2013.01); *C10B 57/02* (2013.01); *C10J 3/00* (2013.01); *C10K 3/008* (2013.01); *B01D 2256/16* (2013.01); *B09B 2101/75* (2022.01); *B09B 2101/80* (2022.01); *B09B 2101/85* (2022.01); *C01B 2203/0405* (2013.01); *C01B 2203/042* (2013.01); *C01B 2203/068* (2013.01); *C10J 2300/0946* (2013.01)

(58) Field of Classification Search
CPC ............ B09B 2101/75; B09B 2101/80; B09B 2101/85; C01B 3/02; C01B 3/501; C01B 3/56; C01B 2203/0405; C01B 2203/042; C01B 2203/068; C10B 53/00; C10B 53/02; C10B 53/07; C10B 57/02; C10J 3/00; C10J 2300/00; C10K 3/008
See application file for complete search history.

(56) References Cited

U.S. PATENT DOCUMENTS

| | | | |
|---|---|---|---|
| 9,850,433 B2 | 12/2017 | Brandhorst, Jr. et al. | |
| 10,538,707 B2 * | 1/2020 | Brandhorst, Jr. | ....... C10B 45/00 |
| 10,640,711 B2 | 5/2020 | Brandhorst, Jr. et al. | |
| 2013/0153826 A1 * | 6/2013 | Paquet | ..................... C01B 3/48 252/373 |
| 2014/0182194 A1 | 7/2014 | Unger et al. | |
| 2015/0291438 A1 * | 10/2015 | Merritt | ..................... C01B 3/36 423/352 |

FOREIGN PATENT DOCUMENTS

| | | |
|---|---|---|
| DE | 10018201 A1 | 10/2001 |
| DE | 10047787 A1 | 3/2002 |
| DE | 10033453 B4 | 11/2006 |
| WO | 2015024102 A1 | 2/2015 |

OTHER PUBLICATIONS

International Searching Authority, "Notification of Transmittal of the International Search Report and the Written Opinion of the International Searching Authority, or the Declaration", in connection to PCT/US2021/050485, filed Sep. 15, 2021, 12 pages, mailed Dec. 20, 2021.

Brunning, A., "Periodic Graphics," Chemical & Engineering News, Jun. 17, 2019, 1 page.

Pattabathula et al., "Introduction to Ammonia Production," Chem. Eng. Prog, 2016, vol. 112, No. 9, pp. 69-75.

* cited by examiner

PRODUCTION OF GREEN AMMONIA FROM THERMOLYZER GAS

CROSS REFERENCE TO RELATED APPLICATIONS

This is a U.S. National Phase Application of PCT/US2021/050485, filed Sep. 15, 2021, which claims priority under 35 U.S.C. § 119 to provisional application Ser. No. 62/706,873 filed Sep. 15, 2020, titled Production of Green Ammonia from Thermolyzer Gas, herein incorporated by reference in its entirety including without limitation, the specification, claims, and abstract, as well as any figures, tables, or drawings thereof.

FIELD OF THE INVENTION

The invention relates to clean, safe, and efficient methods, systems, and processes for utilizing thermolysis methods to process various waste sources and convert these waste sources into valuable outputs, including for example Clean Fuel Gas, Char, and Biochar. The process can further beneficially convert the Clean Fuel Gas into a Hydrogen source for green ammonia production and also products a natural and renewable gas, wherein the process is 100% renewable. The thermolysis provides an advanced pyrolysis methodology for heating and converting a myriad of waste sources, such as tires, all seven grades of plastics and wood, to unexpectedly generate green ammonia and natural gas. In a particular aspect, the methods process waste sources to effectively separate, neutralize and/or destroy halogens and other hazardous components to provide a Clean Fuel Gas, Char and/or Biochar, which can then further be processed to extract and purify hydrogen for green ammonia production from the Clean Fuel Gas and thereby provide a natural gas. The natural and renewable gas is also produced as it is continually produced and further available for use to provide energy and new products.

BACKGROUND OF THE INVENTION

The global markets for disposal and/or repurposing of waste sources continues to rise. Examples include, carpets/rugs, polymeric materials including plastics, electronic waste, solid waste, wood sources treated with chemical preservatives (e.g. telephone poles, railroad times), tires, manure, auto shredder residue, glass and carbon fiber composite materials, municipal solid wastes, medical wastes, etc. Each of these waste sources presents environmental concerns as landfills are not suited to accept the potentially toxic waste sources. For example, many treated wood waste sources have chlorine and arsenic-containing preservatives that make their disposal difficult. Moreover, many landfills are reaching their capacity.

When disposal of waste sources is not practical, recycling of the waste is the next best option. When landfilling and/or recycling presents difficulties and/or are not economically feasible incineration remain the primary option for disposal of the waste source. However, incineration is known to result in the generation and atmospheric release of toxic compounds and increases $CO_2$ emissions. This is a result of the chemicals, such as preservatives and/or flame retardants that are used in the waste sources, such as creosote, chlorinated phenols, arsenic-containing preservatives such as chromium arsenate and chromated copper arsenate, and other toxic chemicals. As a skilled artisan appreciates the toxic components vary significantly by waste source and landfills and recycling centers are not equipped to address the unique needs of all waste sources. As waste abound in need for efficient processing, recycling and/or disposal, there is a need for efficient processing of a variety of waste sources.

In addition to the disposal and processing of waste sources there is an ongoing desire to convert waste sources into useable outputs. For example, more than 150 megametric tons of ammonia are produced each year. The United States alone consumes approximately 14 million tons of ammonia gas annually. Much of this gas is used for agriculture and food production, particularly as a fertilizer. However, ammonia gas has a variety of other uses in pharmaceutical compounds, as a cleaner, chemical intermediate, and in energy storage. For example, ammonia is used as a refrigerant gas, for purification of water supplies, and in the manufacture of plastics, explosives, textiles, pesticides, dyes and other chemicals. It is frequently found in both household and industrial cleaning solutions.

Although ammonia has many important uses, ammonia generation is responsible for some of the highest levels of carbon dioxide waste production and energy consumption in the chemical industry. The primary method of generating ammonia gas is the Haber-Bosch process, which converts natural gas, i.e. methane, to ammonia. This process begins by generating hydrogen gas from fossil fuel feedstocks. Typically, a reformer will turn the feedstocks into synthesis gas (i.e. also referred to as syngas) (i.e. stream methane reforming (SMR) using methane, water and air), which is a mixture of gases including carbon dioxide, carbon monoxide, water, and hydrogen gas. Next, a carbon monoxide shift converter combines carbon monoxide from the syngas with water to form carbon dioxide and more hydrogen gas. This reaction product is treated with an acid gas to isolate the hydrogen. Ammonia is then generated by combining this hydrogen gas with a source of nitrogen. These current processes use a significant amount of energy and produces an estimated 1.8% of the global $CO_2$ emissions. Not only do these current processes fail to produce "green" ammonia, they instead produce "blue" hydrogen (i.e. produced when the $CO_2$ emissions from the SMR process are captured and stored). Accordingly, alternative processes to produce "green" ammonia are still needed.

In additional examples, a conventional hydrogen plant is taught in U.S. Pat. Nos. 7,682,597 and 5,131,930, herein incorporated by reference in its entirety, which is operated with natural gas as the starting material. In the plant, catalytic splitting, generally operated with steam, of hydrocarbons contained in the natural gas first takes place, in a heated reformer, to produce carbon monoxide and synthesis gas that contains hydrogen. Afterwards, catalytic conversion of the carbon monoxide to hydrogen takes place, and subsequently, pure characterization of the hydrogen takes place, using a pressure swing adsorption system. The waste gases of the adsorption system are passed back to the combustion chamber of the reformer, and there they are burned, together with additional natural gas that is supplied. It is also known to use refinery gas or other combustion gases as the additional fuel. A significant amount of carbon dioxide is produced by means of the steam splitting of the methane, in accordance with the water gas equilibrium $CO + H_2O \Longrightarrow H_2 + CO_2$ which increases further in the conversion stage, by means of the carbon monoxide conversion, to a concentration of approximately 16 vol.-% (dry), in general. This amount of carbon dioxide gets into the atmosphere by way of the chimney of the combustion chamber, together with the carbon dioxide produced by the firing of additional fuels that contain carbon. The $CO_2$ content in the flue gas generally lies above 20 vol.-% (dry). In a refinery, a hydrogen plant designed in this manner therefore represents one of the major carbon dioxide emitters.

Although the Haber-Bosch is the preferred and most optimized method of generating ammonia gas, carbon dioxide waste is generated at every step in the conversion process. The Haber-Bosch method creates between 2-2.5 tons of carbon dioxide waste for every ton of ammonia. Therefore, there is ongoing need to reduce this carbon dioxide waste. It has been envisioned that "green" ammonia could be produced using solar photovoltaic systems to generate the electricity to produce hydrogen from water electrolysis (i.e. water electrolytically cracked using electricity). This hydrogen would then combine with nitrogen that has been separated from air and fed into the Haber-Bosch process, wherein electricity for both the electrolysis of water and the separation of nitrogen from oxygen in the air would ideally be supplied by solar photovoltaic or wind power.

There are some environmentally friendly methods of generating ammonia, often referred to as "green ammonia." To be "green" a process must be 100% renewable which is difficult to achieved. There are some methods of producing ammonia that produce little or no greenhouse gases, such processes require high levels of power, via electrolysis. As existing green ammonia production methods consume high quantities of power, they cannot be considered completely green. For example, U.S. Pat. No. 7,682,592, which is herein incorporated by reference in its entirety, provides a method for extracting hydrogen from a methane-containing gas, preferably natural gas, which is said to reduce carbon dioxide emissions. However, this method is still largely dependent upon the use of fossil fuels. Even if an alternative source of methane was used, the method still requires high amounts of energy generate the hydrogen.

Other methods, such as those in U.S. Pat. No. 6,037,459, which is herein incorporated by reference in its entirety, seek to generate ammonia by reacting dinitrogen with a transition metal complex to obtain a metal-nitrido complex. The metal-nitrido complex is reduced in the presence of a hydrogen source to obtain $NH_3$. However, this process requires the use of expensive transition metals and fails to provide a solution for the green generation of purified hydrogen gas.

Further, regardless of the particular method use, hydrogen purification remains a challenge. For example, U.S. Pat. No. 4,553,981, herein incorporated by reference in its entirety, seeks to minimize waste by treated effluent gas streams for steam reforming in shift conversion, scrubbing and pressure swing adsorption units. In this method, a gas that contains hydrocarbon is reformed with steam and converted. In a scrubber, a $CO_2$ waste gas stream is then separated from the converted gas stream. Subsequently, isolation of hydrogen takes place using a pressure swing adsorption system. The waste gas stream of the adsorption system is compressed and passed back into the reformation and/or conversion. This results in great circulating streams. To avoid an accumulation of inert gases, such as nitrogen, a purge stream must be removed from the waste gas stream of the pressure swing adsorption system. Firing of the reformer takes place in conventional manner. The method is complicated and expensive.

Accordingly, it is an objective of the claimed invention to solve these long-standing problems and need in the art for efficient methods for processing of various waste sources. In particular, it is an objective of the claimed invention to use waste sources that otherwise would go to landfills to decompose and instead use these renewable waste sources to conserve non-renewable fossil fuels, saving them for future generations.

A further objective of the invention is to provide methods for utilizing thermolysis to safely and efficiently convert such waste sources to a Clean Fuel Gas which provides a source of hydrogen to produce green ammonia.

It is a still further objective for the output of the systems to include products (Clean Fuel Gas (thereafter hydrogen and natural gas) and Char/Biochar without the generation of (and beneficially the removal of) toxic byproducts, including creosote and small molecules, including chlorinated phenols and polymers, commonly used in these waste input streams. Toxic byproducts further include, for example, VOCs, aromatics, and polycyclic aromatic hydrocarbons (PAHs), dioxins and furans, including halogenated dibenzodioxins and halogenated dibenzofurans, biphenyls, pyrenes, cadmium, lead, antimony, arsenic, beryllium, chlorofluorocarbons (CFCs), mercury, nickel and other organic compounds. As a result, the methods, systems, and/or processes of the invention meet even the most rigid environmental standards.

A further object of the invention is to provide methods utilizing thermolysis methods to safely and efficiently convert various waste sources to produce green ammonia. In particular, the generation of a Clean Fuel Gas to then separate hydrogen as a reactant to form green ammonia provides a desirable waste-to-energy pathway from a previously unutilized waste source through the recycling of tars and oils to generate Clean Fuel Gas to thereby provide a hydrogen source while also generating natural gas.

A still further object of the invention is to utilize thermolysis methods to destroy (and beneficially not generate any additional) toxic halogenated organic compounds or hazardous inorganic chemicals present in certain components of the waste sources.

A further object of the invention is to utilize thermolysis methods to generate clean, useable fuel gas sources and natural gas that is substantially-free or free of halogenated organic compounds (including VOCs).

Other objects, advantages and features of the present invention will become apparent from the following specification taken in conjunction with the accompanying drawings.

BRIEF SUMMARY OF THE INVENTION

An advantage of the invention is the clean and efficient methods for producing green ammonia and natural gas from unwanted and/or hazardous waste sources. It is a further advantage of the disclosed methods that the waste sources are converted by destroying toxic halogenated organic and hydrocarbon compounds present therein, and clean, useable fuel gas sources substantially-free or free of hazardous compounds, including for example halogenated organic compounds, hydrocarbon compounds, and the like.

In aspects, methods for converting a waste source into green ammonia and a clean fuel gas source comprises: inputting a waste source into a thermolysis system; wherein the thermolysis system comprises a primary reactor and at least a secondary reactor, said reactors having a process temperature between about 300° C.-1000° C., at least two gas scrubbers, an oil/water separator, and an oil/tar cracker; destroying and/or removing toxic compounds comprising inorganic and/or organic preservatives present in the waste source; generating outputs of the thermolysis system comprising Clean Fuel Gas, Char and/or Biochar, wherein the reactors generate tars and oils which are thereafter separated from the Clean Fuel Gas in the gas scrubbers, thereafter, cracked in the oil/tar cracker, and sent back to the secondary reactor to generate more of the Clean Fuel Gas and no tars and oils remain in the outputs, wherein the Clean Fuel Gas is substantially-free of halogenated organic compounds; separating hydrogen from the Clean Fuel Gas and generating natural gas; and reacting the separated hydrogen with nitrogen ($N_2$) to produce ammonia ($NH_3$).

In aspects various waste sources as described herein are processed and the exemplary toxic compounds destroyed include pentachlorophenol (PCP), copper naphthenate, ammoniacal copper zinc arsenate, mixtures of coal tar oils, borate compounds, aromatic compounds, arsenic salts, nitrides or other salts, halogenated dibenzodioxins, halogenated dibenzofurans, biphenyls, pyrenes, arsenic, chlorofluorocarbons, or a combination thereof. Moreover, in the various aspects the compounds destroyed include halogenated organic compounds, and the method does not generate any toxic halogenated compounds in the process of converting the waste sources to the outputs.

In aspects, at least a portion of the Clean Fuel Gas source generated is provided back to the thermolysis system as a fuel source. The Clean Fuel Gas comprises syngas that is a gas mixture that can be used to create a liquid biofuel. In aspects, the Clean Fuel Gas source comprises at least about 15 wt-% hydrogen, or between about 15 wt-% to about 40 wt-% hydrogen. In aspects, the step of separating of the hydrogen from the Clean Fuel Gas comprises a separation membrane, and optionally the membrane separation is combined with use of a sorbent, and further optionally the Clean Fuel Gas is pressurized before passing through a separation membrane. To obtain the highest purity hydrogen, the output from the separation membrane can be processed with a pressure swing adsorption process to remove impurities such as carbon dioxide. Beneficially, in aspects the separated hydrogen is a highly purified gas having at least about 95% hydrogen, at least about 96% hydrogen, at least about 97% hydrogen, at least about 98% hydrogen, or at least about 99% hydrogen.

In aspects, the step of reacting the separated hydrogen with nitrogen is a Haber Bosch process, and wherein the nitrogen is extracted from the air through use of a nitrogen unit which may also use a separation membrane to provide nitrogen for the reaction to generate the green ammonia. Beneficially, in aspects the reacting of the hydrogen with nitrogen does not produce greenhouse gases and/or consume high energy. In aspects the ammonia is then cooled to produce liquid ammonia.

In the various aspects it is beneficial that the Clean Fuel Gas and Char/Biochar produced contains less than about 10 ppb of toxic halogenated compounds and contain less than about 10 ppb of polycyclic aromatic hydrocarbons, dioxins and furans.

Figure 1:
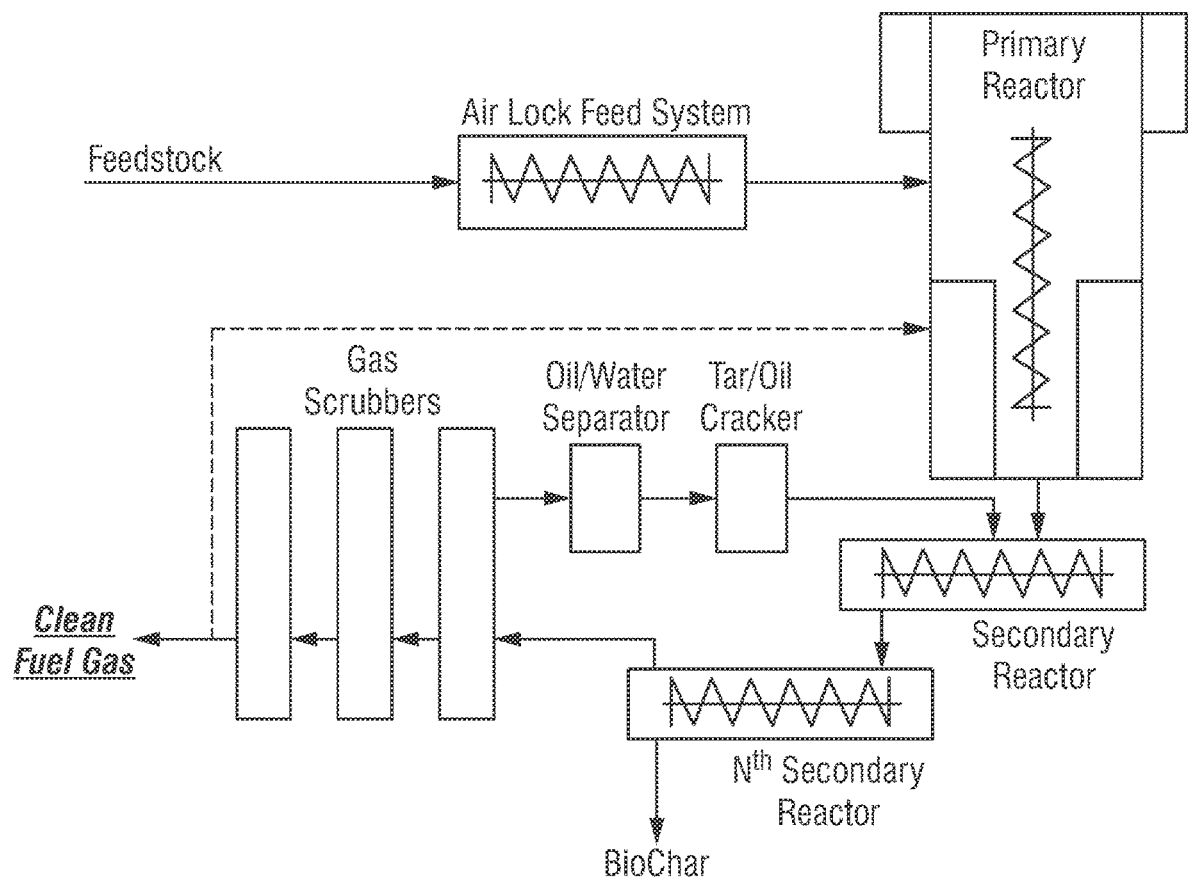
FIGS. 1-2 show exemplary process diagrams for the methods, systems, and/or processes of the invention to produce the Clean Fuel Gas source.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENT

The embodiments of this invention are not limited to particular methods and/or processes for utilizing the thermolysis methods to safely and efficiently convert waste sources into Clean Fuel Gas to be used as a source of hydrogen to produce green ammonia and natural gas, which can vary and are understood by skilled artisans. It is further to be understood that all terminology used herein is for the purpose of describing particular embodiments only and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form. Numeric ranges recited within the specification are inclusive of the numbers defining the range and include each integer within the defined range.

Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The term "substantially-free," as used herein may refer to a minimal amount of a non-desirable and/or toxic component in a material, such as a Biochar generated by the methods, processes and systems of the invention. In an aspect, a material is substantially-free of a defined component if it contains less than a detectable amount of the defined component, or less than about 10 parts per billion (ppb), or more preferably less than about 1 ppb. In an embodiment, Biochar and fuel gas generated according to the processing of the waste is substantially-free of toxins, including halogens, having less than about the detection limit of about 10 ppb, or more preferably less than about 1 ppb of the toxin, including halogens. For toxic and/or hazardous materials, free represents an amount below the detection limit of the appropriate material within experimental error. In an aspect of the invention the Biochar and Fuel Gas Source generated according to the processing methods herein are free of toxins, indicating that there is a non-detectable amount of toxins in the measured source.

The term "substantially-free," as used herein referring to oxygen in the thermolysis methods refers to a minimal amount of oxygen or air. In an aspect, a system is substantially-free of oxygen if it contains less than about 4 wt-%, and preferably less than about 2 wt-%.

The term "thermolysis" as used herein is generally referred to as a thermal-chemical decomposition conversion process employing heat to an input source in need of conversion to a Clean Fuel Gas and Biochar. Thermolysis refers generally to thermal-chemical decomposition of organic materials at temperatures >300° C. and in some instances in the absence of external oxygen to form gases, tars, and oils and Biochar that can be used as chemical feedstocks or fuels. Tars and oils represent groups of volatile organic compounds, viscous liquids, paraffins, waxes, aromatics, aliphatics, fats and other petrochemical based organic mixtures for example. The thermolysis methods disclosed according to the present invention are an advancement over conventional pyrolysis and/or thermolysis methods, which employ fire or a heat source and include an oil as an output. As described herein according to the invention no oil is generated as an output of the thermolysis methods of the present invention. As disclosed in further detail herein, the present thermolysis methods employ at least a reprocessing of any tars and oils. Based on at least these distinctions between the thermal conversion methods, the terms thermolysis and pyrolysis are not synonymous, as thermolysis provides various beneficial improvements not previously achieved by pyrolysis methods and/or conventional thermolysis methods.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The method described herein may comprise, consist essentially of, or consist of the components and ingredients of the present invention as well as other ingredients described herein. As used herein, "consisting essentially of" means that the methods, systems, and/or compositions may include additional steps, components or ingredients, but only if the additional steps, components or ingredients do not materially alter the basic and novel characteristics of the claimed methods, processes and/or systems.

It should also be noted that, as used in this specification and the appended claims, the term "configured" describes a system, apparatus, or other structure that is constructed or configured to perform a particular task or adopt a particular configuration. The term "configured" can be used interchangeably with other similar phrases such as arranged and configured, constructed and arranged, adapted and configured, adapted, constructed, manufactured and arranged, and the like.

The methods described herein relate to thermolysis methods to safely and efficiently convert various waste sources to a Clean Fuel Gas, which is further utilized as a hydrogen source to generate green ammonia and natural gas. Beneficially, the methods described herein provide significant and unexpected advances beyond conventional thermolysis methods and/or conventional methods for synthesizing ammonia. For example, conventional combustion processes which burn waste sources are highly unpredictable and difficult to control and result in significant environmental emissions and other forms of pollution if the char source generated is used in other applications. Although advancements in thermolysis have been made in the prior art, the present invention beneficially exceeds the capabilities of known thermolysis methods in converting waste sources into valuable outputs which beneficially destroy (and do not generate any new) creosote chemicals and other toxic halogenated organic compounds. Moreover, the thermolysis methods of the invention include the use of multiple reactors, reinjection and cracking of any and all tars and oils that are created. As a further benefit, the methods, systems, and/or processes of the present invention generate clean, useable fuel gas sources substantially-free or free of any halogenated organic compounds. Notably, the methods described herein do not simply reduce the amounts of halogenated compounds and other toxins that may be found in waste sources, instead these are removed (with no additional generation) from the waste sources while further providing the useful and valuable outputs of the invention (e.g. fuel gas source) defined further herein. The production of green ammonia from the hydrogen in the fuel gas overcomes the significant limitations of known production methods for ammonia, in utilization of less energy (as well as having a readily available energy source to drive the production from the fuel gas source) and result in dramatic decrease in carbon dioxide waste production and energy consumption.

Waste Sources

The methods and/or processes described herein relate to novel processes using thermolysis methods to safely and efficiently convert various waste sources, into Fuel Gas Source to provide a source of hydrogen for green ammonia production. Applications of use thereof are also provided. Virtually any waste source can be employed according to the methods described herein. In aspects, wood waste sources are preferred for the processing to obtain a Clean Fuel Gas (i.e. syngas) from the process that contains at least about 15 wt-% hydrogen, or at least about 20 wt-% hydrogen, or preferably about 20 wt-% to about 35+wt-% hydrogen, or about 20 wt-% to about 40 wt-% hydrogen.

Exemplary waste sources that are wood provide cellulose and hemicellulose that contain significant hydrogen (e.g. $(C_6H_{10}O_5)_n$) for separation in the thermolysis process for then further separation and production of green ammonia. Exemplary waste sources are described for example in U.S. patent application Ser. No. 16/432,215 where treated wood waste sources are disclosed, which is herein incorporated by reference in its entirety. Exemplary treated wood waste sources include wood that has been chemically treated, such as with preservatives to enhance durability and/or service life of a wood product due to its cellulosic nature subject to decay. Examples of treated wood waste sources include, but are not limited to railroad ties, cross ties, RR crossing roadways, telephone poles, utility poles, cross arm members, bridge timbers, decking, walkways, dock timbers and wharf pilings, lake and ocean pier/pilings, landscaping timbers and edging, treated outdoor engineering structural and other reinforced wood composites, and other end-of-life treated wood materials. The treated wood can be comprised of several types of wood, including for example mixed hardwood and softwood species, such as oak, pine, fir, poplar, maple, ash, elm, birch, hickory, etc. The treated wood can be comprised of treated outdoor engineering structural and other reinforced wood composites as well, including for example glue-laminated lumber and fiber-reinforced laminated products. The treated wood waste sources also commonly include metal or other components in addition to the wood and chemical components. In some embodiments, the treated wood sources can have up to 20 wt-% or greater, or even 25 wt-% or greater chemical components with the remainder comprising wood. The wood can be treated with various chemical components to provide preservative effects for its applications of use. Chemical components commonly include organic and inorganic compounds, such as creosote, pentachlorophenol (PCP), copper naphthenate, ammoniacal copper zinc arsenate, mixtures of coal tar oils (including heavy petroleum oil), borates, copper zinc chromium or arsenic-containing preservatives, aromatic compounds including chlorinated phenols (e.g. Cl-phenol), arsenic salts (e.g. Cr—Cu-arsenate (CCA)), nitrides (e.g. CuN) other salts, and the like. In an exemplary embodiment, the toxic compounds comprise pentachlorophenol (PCP), copper naphthenate, ammoniacal copper zinc arsenate, mixtures of coal tar oils, borate compounds, aromatic compounds, arsenic salts, nitrides or other salts, halogenated dibenzodioxins, halogenated dibenzofurans, biphenyls, pyrenes, arsenic, chlorofluorocarbons, or a combination thereof.

Exemplary waste sources are described for example in U.S. Pat. No. 9,850,433 where electronic waste sources are disclosed, which is herein incorporated by reference in its entirety. Waste electrical and electronic equipment (WEEE) refers to the spectrum of products ranging from computers, printers, and faxes, to washing machines. In particular, WEEE are classified into 14 distinct categories including: Large household appliances; Small household appliances; IT and Telecommunications equipment; Consumer equipment; Lighting equipment; Electrical and electronic tools; Toys, leisure and sports equipment; Medical devices; Monitoring and control instruments; Automatic dispensers; Display equipment; Refrigeration equipment; Gas discharge lamps; and Photovoltaic panels. The four major categories of e-waste which are included in the WEEE classifications include: Printed Wiring Boards (PWBs), e-plastics, Flat screen displays (FSDs) and toner cartridges. As one skilled in the art ascertains, myriad other types of electrical and electronic devices such as cell phones, laptops, handhelds, appliances, and other devices are all included within these classifications. WEEE are particularly well suited for processing according to the methods described here.

Further exemplary waste sources are described for example in U.S. Pat. No. 9,816,033 where carpet, rug, polymeric materials and other waste sources are disclosed, which is herein incorporated by reference in its entirety. Such waste sources include common forms of consumer waste including nylon (PA), polypropylene (olefin), polytrimethylene terephthalate (PTT), polyester (PET), acrylic (or acetates), wool, other synthetic fibers, carpet adding, carpet fillers carpet backing materials, and combinations thereof. In a further aspect, the waste source comprises non-carpet and/or rug polymeric materials. In a further aspect, the polymeric materials is selected from the group consisting of polyethylene terephthalate (PETE or PET), high-density polyethylene (HDPE), polyvinyl chloride (PVC), low-density polyethylene (LDPE), polypropylene (PP), polystyrene (PS), Polycarbonate (PC), polylactide and combinations thereof. In a further aspect, the waste sources are solid, such as tires, manure and/or other solid wastes including, auto shredder residue, textiles, composite materials, municipal solid waste, medical waste, waste wood, and/or mixtures of all these wastes A significant source of plastic waste sources is also understood to include 'ocean plastics' which are a significant waste source in need of processing to remove from the ocean waters.

Chemical components that can be in the waste sources can also include other halogens, halogenated compounds and/or hazardous or toxic polymers. Such components contain at least one type of halogenated molecule (such as bromine or chlorine). Pentachlorophenol (PCP) is a commonly employed halogenated compound that is a carcinogen and requires destruction. The PCP and by-products of its synthesis and destruction (including as disclosed at www.pentachlorophenol.info, which is herein incorporated by reference in its entirety) are all beneficially destroyed according to the invention.

In an aspect, regardless of the chemical components used to treat the waste source, the invention beneficially recovers the energy in the waste source and returns it as a reusable energy source, and further safely decomposes any hazardous creosote and other chemical components including halogenated compounds and polymers without the production of any toxic components (such as dioxins and furans). As referred to herein, 'dioxins' refer to the family of compounds that include polychlorinated dibenzodioxins and 'furans' refer to the family of compounds that include polychlorinated dibenzofurans. These and other benefits of processing the described waste sources according to the invention are disclosed here.

As one skilled in the art will ascertain, waste sources according to the invention differ based upon the types of chemical treatment of the waste sources. As one skilled in the art ascertains, there are significant differences among chemical treatments and preservatives available requiring processing according to this invention. The methods and/or processes of the present invention unexpectedly provide suitable conditions for the conversion of such diverse waste sources into desirable outputs described herein. However, the nature of the particular waste source will impact that particular thermolysis methods, systems, and/or processes of the present invention to convert such waste sources into a Clean Fuel Gas to be used as a source for generating the green ammonia and natural gas, along with the Char and Biochar.

Thermolysis Methods

The methods, systems, and/or processes of the present invention relate to thermolysis methods to safely and efficiently convert waste sources to gas/vapor mixtures and carbonaceous materials, namely a Clean Fuel Gas source and a Biochar. The Clean Fuel Gas source is suitable for use in powering a facility as an energy source and/or further used as a source of hydrogen for the production of green ammonia and natural gas. The Char and Biochar are suitable for various applications of use. In an aspect, the gas/vapor including halogens are cleaned and removed as disposable salts. In a further aspect, any mercury is vaporized in the reactors of the system. As a result of the methods described herein, a clean Char/Biochar and Clean Fuel Gas are the only products of the system. The Clean Fuel Gas is further used as a source for generating the green ammonia and natural gas in the methods, systems, and/or processes of the present invention.

As referred to herein the thermolysis methods employ a continuous, oxygen-free thermal processing of the waste sources using heat energy. Beneficially, the methods, systems, and/or processes of the present invention convert the waste sources by destroying hazardous organic preservatives and chemicals and not generating additional toxic halogenated organic compounds present in the waste sources. As a further benefit, the methods, systems, and/or processes of the present invention generate clean, useable fuel gas sources substantially-free or free of halogenated organic compounds. This provides a fruitful source of hydrogen to separate for green ammonia product and then use of the natural gas. In some aspects, the inorganic chemical compounds in the waste sources are substantially removed or removed by the methods and/or processes or remain in the Char/Biochar as a harmless product.

As a still further benefit, the invention providing for the generation of a Clean Fuel Gas and Biochar without the formation of (along with the destruction of) halogenated compounds beneficially prolongs the life span of the systems employed for the thermolysis methods. Without being limited according to a particular mechanism, the reduction of formation of halogenated compounds including chloride species, such as hydrogen chloride which is known to form hydrochloric acid in solution with water, reduces the corrosive damage caused to the systems, such as valves, filters, reactors and the like.

In an aspect the systems and apparatuses utilized for the methods and processes of the present invention includes at least the following components as substantially depicted in FIG. 1, including: a feedstock input, airlock, at least one reactor (and preferably a series of reactors), gas scrubbers, tar/oil crackers (or may be referred to as cracking reactor), collection tanks for Biochar, and output for Clean Fuel Gas. Additional optional components may include for example, pipes for addition of steam generated via heat exchange for injection into the reactor(s). Modifications to these systems and apparatuses, including as described herein, are considered within the level of ordinary skill in the art based upon the description of the invention set forth herein.

In an aspect the methods, systems, and/or processes of the present invention include the steps as substantially depicted in FIG. 1, including the following processing steps to produce a Clean Fuel Gas source: shredding, chopping and/or grinding of the waste source inputs; a reaction or series of thermolysis reactions in a substantially oxygen-free continuous, low pressure thermolysis process with indirect heating; employing more than one reactor for the thermolysis reactions; separation of Biochar; a tar and oil reprocessing or cracking step; and scrubbing of the fuel gas.

Figure 2:
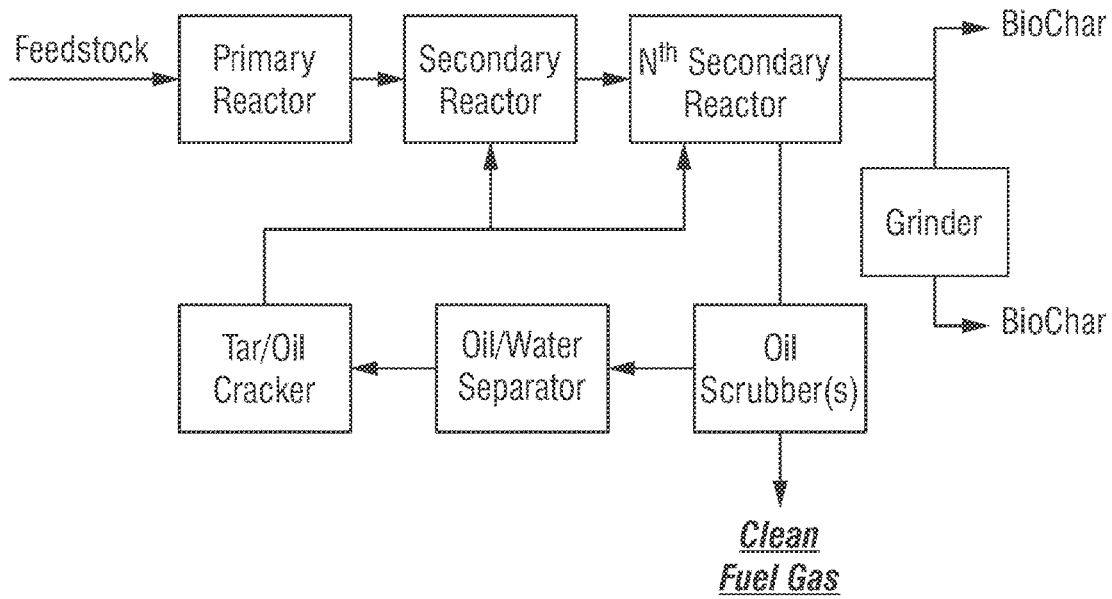

In an aspect the systems and apparatuses utilized for the methods and processes of the present invention to produce a Clean Fuel Gas source includes at least the following components as substantially depicted in FIG. 2, including: a feedstock input, at least one primary reactor and at least one secondary reactor (and preferably a series of secondary reactors), at least one oil/gas scrubber, at least one oil/water separator, at least one tar/oil cracker (or may be referred to as cracking reactor), an optional grinder for the Biochar, at least one collection tank for Biochar, and output for Clean Fuel Gas. Additional optional components may include for example, pipes for addition of steam generated via heat exchange for injection into the reactor(s). Modifications to these systems and apparatuses, including as described herein, are considered within the level of ordinary skill in the art based upon the description of the invention set forth herein.

In an aspect the methods, systems, and/or processes of the present invention include the steps as substantially depicted in FIG. 2, including the following processing steps to produce a Clean Fuel Gas source: shredding, chopping and/or grinding of the waste source inputs; a reaction or series of thermolysis reactions in a substantially oxygen-free continuous, low pressure thermolysis process with indirect heating; employing more than one reactor for the thermolysis reactions; separation of Biochar and optional grinding of Biochar to provide smaller particle sizes for various applications of use; oil scrubbers (wherein a series of parallel oil scrubbers could be used for decreased processing time and increased surface area; or wherein a series of sequential oils scrubbers can be used); oil/water separators; and a tar and oil reprocessing or cracking step.

The methods, systems, and/or processes of the present invention may optionally include one or more of the following steps: initially processing the waste input to remove and/or recover creosote compositions (or other specific contaminant in the waste source), drying the waste input or adding moisture to the waste input (e.g. via steam injection into the reactor to enhance gasification); employing additional gas scrubbers; and collection and separation of components from the Biochar.

Figure 3:
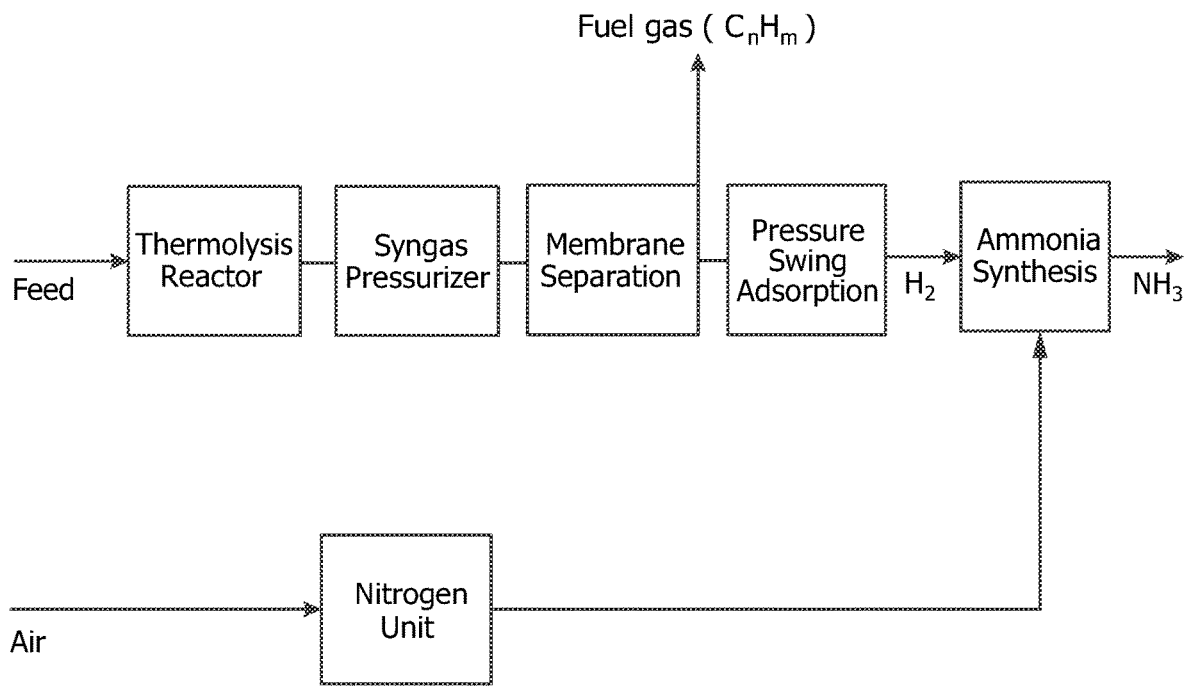
FIG. 3 shows an exemplary process diagram for the methods, systems, and/or processes of the invention to produce the green ammonium from the Clean Fuel Gas source.

The methods, systems, and/or processes of the present invention further include the steps as substantially depicted in FIG. 3, including the following processing steps to produce green ammonia from the Clean Fuel Gas source: pressurizing the Clean Fuel Gas source to pressures between about 125 and 400 bar, and preferably between about 140 and 325 bar, and passing it through a membrane to separate hydrogen and $CO_2$ from the methane, CO, and other $C_2$-$C_4$ hydrocarbons in the gas removing fuel gas ($C_nH_m$ and CO) from the system; separating hydrogen from $CO_2$ through pressure swing adsorption at pressures from about 100 to about 750 pounds per square inch, or preferably about 130 to about 600 pounds per square inch to maximize adsorption of $CO_2$ on the adsorbent material. $CO_2$ can be separated and collected in a separation column with materials designed to collect or adsorb the $CO_2$. Depending on the gas composition, multiple adsorbent materials can be used. Then the pressure is reduced to about atmospheric pressure to desorb the unwanted $CO_2$. Beneficially, the $CO_2$ removed from the system can be sold commercially for multiple uses. The pressure swing adsorption relies on the different adsorption/release properties between $H_2$ and $CO_2$ to separate the gases. The hydrogen is weakly adsorbed hence can be extracted to be used in making ammonia. The separated fuel gas can then be used in various applications to generate electricity (e.g. in a turbine or internal combustion engine) or used to make steam or as process heat. For example fuel gas can be piped (e.g. through a compressor) to a storage tank for such use.

The hydrogen is extracted to be used in making ammonia. Once the $CO_2$ is removed the pressure is again increased (e.g. with another compressor) for the Haber-Bosch reactions to generate the ammonia. In aspects, larger systems have a singular compressor and pumps to the needed pressure in the tank, whereas in other aspects more than one step can be required (which may or may not use the same compressor). The methods, systems, and/or processes of the present invention can be carried out in a variety of apparatus for thermolysis. An exemplary device or series of reactors, further including oil and other separators, char/oil separators, gas scrubbers, evaporators, and the like are shown for example in U.S. Patent Publication No. 2014/0182194, which is incorporated herein by reference in its entirety.

In an aspect, the invention includes an initial shredding, chopping and/or grinding step of the waste sources, each of which may be referred to herein as shredding and/or grinding. The scope of the invention is not limited with respect to this initial processing step to reduce the size of the input waste source and provide a substantially uniform input source. In an aspect, the waste sources can be placed directly into a grinder or shredder. In an aspect, the grinding and/or shredding step provides substantially uniform pieces of the input source. In an aspect, the grinding and/or shredding step provides pieces of the input source having an average diameter of less than about 5 inches, preferably less than about 2 inches, preferably less than about 1 inch, or in some aspects, to less than about 0.5 inches. In an aspect, the shredding and/or grinding can include a first coarse shredding step followed by a fine shredding and/or grinding step. In an alternative aspect, the shredding and/or grinding can include a single processing step.

Various shredding and/or grinding techniques may be employed according to the invention to provide the waste input source in a desirable size or form for processing. In a preferred aspect, the waste sources are ground and/or shredded to a size of less than about 5 inches, or less than about 2 inches, or less than about 1 inch to provide a substantially uniform input source. In a further preferred aspect, the substantially uniform input source is combined with any dust or other debris from the shredding and/or grinding step that is recovered for processing according to the methods of the invention.

Beneficially, according to the invention a variety of waste sources and other waste sources can be processed according to the invention without substantial extraction steps to remove or separate various components for distinct and separate processing. This is a significant benefit over processing systems and techniques of the prior art requiring substantial sorting and separation of components. This is a known limitation of recycling efforts, that a great deal of manual and/or mechanical energy is required to sort and separate materials to be recycled. The present invention does not require such extensive separation into similar types of materials for the processing of the waste sources.

Creosote Recovery in Certain Waste Sources

However, in certain embodiments an initial step of creosote recovery may be valuable for certain applications where it is desirable to recover the creosote instead of destroying the compounds in the processing of the waste sources, such as treated wood waste sources. In an embodiment, liquid creosote compositions can be extracted from treated wood waste sources having been treated with creosote compositions. In embodiments where creosote recovery (i.e. recovery and collection for use in other applications) is beneficial, such as the collection and reuse of coal tar distillates and fractions, the creosote is recovered before the treated wood waste source is processed according to the thermolysis methods and reactions described herein. The steps for recovering creosote are not depicted in FIGS. 1-2, instead they would precede the feeding of the waste source to the primary reactor, either before or after the step of shredding the waste source.

An exemplary embodiment for initial processing of the waste source to recover creosote is for end-of-life railroad ties. This waste sources is estimated to contain about 10-30% or about 15-25% liquid composition, referred to as wood vinegar. Wood vinegar contains water (moisture/aqueous component that is the decomposed wood in the wood waste source), wood cellulose fragments, creosote components (PAHs). The liquid composition can have about 10-16% creosote content. These components will gasify and not condense in the water. Accordingly, methods to collect the creosote can provide beneficial reuse.

In an embodiment, the method for recovery of creosote comprises providing the treated wood waste source to a preheated chamber, preferably at a temperature range from about 300-350° C., as the creosote hydrocarbons in the wood vinegar begin to evaporate at a temperature of about 250° C. Such a creosote recovery chamber would be located externally to the reactor system to enable recovery without affecting the internal reactor conditions needed for quality biochar production. The treated wood waste sources remain in the chamber for a few minutes (e.g. 1 minute to about 60 minutes) to at least an hour to allow volatilization and evaporation of the creosote compounds. The gas vapors are then condensed and removed from the chamber. The remaining treated wood waste source is then provided for processing in the reactors using the thermolysis methods described herein.

Processing Methods to Produce Clean Fuel Gas and Char/Biochar

In an aspect, the invention involves a reaction or series of thermolysis methods and reactions in a substantially oxygen-free continuous, low pressure, thermolysis process using heat energy. In an aspect, low pressure includes from about 10 to about 100 millibar, or any range therein. In an aspect, the invention involves an oxygen-free continuous, low pressure, thermolysis process in a reactor or series of reactors. As referred to herein, the oxygen-free process in the reactor(s) does not include air or oxygen in contact with the waste input source. Beneficially, because of the reduction and/or elimination of oxygen from the methods, systems, and/or processes of the present invention, the waste input sources are not exposed to flame and/or fires or plasma source and therefore do not form polycyclic aromatic hydrocarbons (PAHs), halogenated dibenzodioxins, halogenated dibenzofurans, biphenyls, and/or pyrenes, or other halogenated organics. In an aspect, the total aggregate composition of the waste sources comprising up to 10% halogen content (including for example PAH and borate compounds), often from 0.01% to 10%, or from 0.1% to 5% are processed according to the methods, systems, and/or processes of the present invention without the creation of PAHs, halogenated dibenzodioxins, halogenated dibenzofurans, biphenyls, and/or pyrenes. As one skilled in the art will appreciate, the various waste sources will vary in the halogen content introduced for processing.

In a further aspect, the invention further includes the destruction of toxins, namely halogen compounds in addition to not generating any toxins as mentioned above. In an aspect, the methods destroy aliphatics, aromatics, and polycyclic aromatic hydrocarbons, halogenated dibenzodioxins, halogenated dibenzofurans, biphenyls, pyrenes, chlorofluorocarbons, etc.

In an aspect, the invention employs the substantially oxygen-free or oxygen-free continuous, low pressure thermolysis process with supply of heat energy. Thermolysis methods are known to employ different methods and amounts of heat energy, including for example: Low temperature thermolysis with a process temperature below 500° C.; medium temperature thermolysis in the temperature range 500 to 800° C.; and melting thermolysis at temperatures of 800 to 1,500° C. According to aspects of the present invention, the substantially oxygen-free or oxygen-free continuous, low pressure thermolysis process applies indirect heating. In an aspect, the heating includes processing the waste source input at temperatures of about 300° C. to 1000°

C., preferably from about 400° C. to 650° C. Beneficially, the use of a lower temperature thermolysis process places less stress on a reactor(s) (such as steel reactors), requires less energy to run the continuous process according to the invention, and further maintains metals in contact with the system at lower temperature ranges which improves longevity, processing, etc. within a plant facility.

In an aspect, a reactor or series of reactors (also referred to as cascading reactors) allows for the thermolysis processing over the lower range of temperatures from about 300° C. to about 1000° C., preferably from about 400° C. to 650° C. As one skilled in the art understands, there is not a single processing temperature for an input source according to the invention; instead, a range of temperatures within a reactor (or series of reactors) is obtained. For example, within a single reactor the input source within the head of the reactor may be at a higher temperature than the bottom of the reactor. In addition, as one skilled in the art understands, the use of a single reactor may necessitate a higher temperature range, such as from about 600° C. to about 800° C., where a series of reactors enables a lower range of temperatures, such as from about 400° C. to about 600° C. In preferred aspects, the reactor(s) employed according to the methods of the invention do not require design for withstanding high temperature/pressure, as the relatively low temperature and pressures are employed (such as on average about 650° C. and ambient pressures of on average about 50 mbar).

The continuous thermolysis process is carried out in at least one reactor to undergo at least partial gasification under the conditions including temperature and pressure as described herein according to various embodiments. Various reactors known in the art can be employed, including for example, rotary drum reactors, shaft reactors, horizontal reactors, entrained-flow gasifiers, fixed-bed gasifiers, entrained-flow gasifiers, or the like. Exemplary reactors are disclosed, for example in, U.S. Publication No. 2014/0182194 and DE 100 47 787, DE 100 33 453, DE 100 65 921, DE 200 01 920 and DE 100 18 201, which are herein incorporated by reference in its entirety. As one skilled in the art will ascertain the number, sequence and scale of the reactors employed according to the invention can be adapted pursuant to the scale and volume of the waste sources inputted, which are embodied within the scope of the invention.

In some embodiments, a primary reactor employed according to the invention may comprise, consist of or consist essentially of input region with distributor, reactor mixing chamber, high-temperature region, high-temperature chamber, heating jacket chamber with burners, conversion section, inner register, and/or heat transfer register. In exemplary embodiments, a secondary (or tertiary) reactor(s) employed according to the invention may comprise, consist of or consist essentially of gas compartment with dome, high-temperature chamber with vertical conveying device, inner register and outer register, conversion section with conveyor device, heating jacket chamber and/or combustion chamber.

In an aspect, the reactor(s) are jacket heated. In an aspect, the reactors are vertically and/or horizontally disposed over a range of angles. In an aspect, at least two reactors are employed. In an aspect, at least three reactors are employed. In a preferred aspect, at least one reactor or a primary reactor is vertical with a moving bed design and counter-current flow for the fuel gas along the heated walls into secondary reactors. Without being limited according to an embodiment of the invention, such designs minimize the creation of undesirable tars and fuel oils. In a further preferred embodiment, a moving bed design is further employed for a secondary horizontal reactor which extends the controlled reaction time and temperature of the fuel gas and Biochar from improved solid/gas and gas/gas reactions according to the invention.

The of waste sources undergo the conversion in the reactor(s) for an amount of time enough to provide at least partial conversion and substantially as set forth according to the methods of U.S. Publication No. 2014/0182194. In an aspect, the amount of retention time in a reactor(s) varies from at least about 20 minutes, at least about 30 minutes, at least about 40 minutes, at least about 50 minutes, at least about 60 minutes, or at least a few hours as may vary based upon factors including for example the total aggregate amount of chemistry (e.g. preservatives and treatment) on the waste sources. Unexpectedly, despite the cellulosic nature of the waste source, which one skilled in the art would not expect to require additional processing time using the thermolysis methods, the processes and methods requiring extended reaction time to ensure that the PAH, and particularly the PCP molecules are destroyed completely. In some aspects, the processing time is unexpectedly increased by at least about 20% or even 25% as a result of the longer retention time for complete removal of the oils and tars along with all hazardous components from the system.

In an aspect, the pressure in the reactor(s) is held constant within a pressure range from about 10 to about 100 millibar, or preferably from about 20 to about 50 millibar.

In an aspect, a moisture content of a waste input source may be measured to determine whether moisture is to be added to the system for improved gasification. In an aspect, steam is generated via heat exchanger and the process steam is injected through pipelines directly into a reactor(s) head to increase moisture content. In an aspect, a waste input source having a low moisture content, such as below about 10%, below about 9%, below about 8%, below about 7%, below about 6%, below about 5%, below about 4%, below about 3%, below about 2%, or less, will have steam injected into the process to improve the gasification reaction. In an aspect, steam is added to the reactor(s) head to increase moisture content to at least about 10% to improve the gasification process of the low-density input of the feedstock.

In an additional aspect, monitoring of the pressure in the reactors can be employed to determine if further moisture is to be added to the system for improved gasification. In such an aspect the reactor system controls automatically adjust volume of steam based on temperature and pressure in the reactor to optimize the gasification reaction.

In an aspect, the methods further include a tar and oil cracking step. As one skilled in the art appreciates, tars and oils are an unavoidable product of the pyrolysis process, which are a non-heterogeneous mixture of olefins and paraffins, which contain tars and hazardous components including poly aromatic hydrocarbons (PAHs). These hazardous components include carcinogens benzene, toluene and chlorinated-brominated components, PCP, PVC and/or halogenated compounds present in the waste feedstock. The pyrolytic oils have a low flash point and are known to be extremely hazardous (often requiring hazardous regulatory permits in various countries). Beneficially, according to the invention such unavoidably created tars and oils are merely an intermediate and are subsequently cracked to ensure removal before generating the outputs of Clean Fuel Gas and Biochar.

As referred to herein, "cracking" refers to the process whereby complex organic molecules are broken down into simpler molecules, such as light hydrocarbons, by the breaking of carbon-carbon bonds in the precursors. Thus, cracking describes any type of splitting of molecules under the influence of heat, catalysts and solvents. Accordingly, tars and oils are not collected or an output of the thermolysis methods of the invention. In a preferred aspect, more than one gas converter (cracking reactor) will be employed either in sequence or in parallel to ensure that the higher organic components are further degraded. This removal and conversion of these heavy oils or tars into Clean Fuel Gas is desired to remove these materials which selectively absorb halogenated hazardous substances. In an aspect, the step recycles tars and oils through at least one reactor system to remove the hazardous halogenated compounds. In a further aspect, the tar and oil cracking step has the beneficial effect of creating more clean fuel gas.

In an aspect, the generated tars and oils are processed in the presence of an optional catalyst, such as for example zeolite. In an embodiment, the cracking step separates light and heavy oils, such as disclosed for example in U.S. Patent Publication No. 2014/0182194, which is incorporated herein by reference in its entirety.

In an aspect, the methods may further include an optional cooling step for the gas. In some embodiments, the gas will be cooled due to further processing in a scrubbing stage. For example, a cooled conversion chamber may be in connection with a reactor according to the methods of the invention. In an aspect, a gas at a temperature from about 400° C.-800° C. is cooled to a temperature below about 100° C., or preferably below about 80° C. The gas may further thereafter be cooled to an ambient temperature, such as in an adjacent water scrubber to remove any excess water and/or steam from the gas.

In an aspect, the methods may further include a conditioning step, such as employing additives in the gas scrubbers. In an embodiment, gas produced may be further purified following cooling at a gas scrubbing stage and then gas separating stage, i.e. an alkaline stage (for example, NaOH or $Ca(OH)_2$ or the acetate salt of calcium or similar for the binding of HCl and HBr) and fed to the downstream process. In some embodiments the gas is cooled and can then undergo additional scrubbing, such as to remove sulfur or other components from the gas.

In an aspect, the methods convert the waste sources into a Biochar and a Clean Fuel Gas source. In an aspect, the invention will further include a recycling step for the recycling of any oils and tars created from the methods described herein. In an aspect, the recycling of the oils and tars involves cracking them and then reprocessing the shorter chain molecules into a main reactor to be converted into additional Clean Fuel Gas. The cracking can occur at a temperature range of from about 350° C. to about 1100° C. and may be in the presence of catalysts, such as zeolites. In an aspect, the generated tars and oils are processed in the presence of an optional catalyst, such as for example zeolite. In an embodiment, the cracking step separates light and heavy oils, such as disclosed for example in U.S. Patent Publication No. 2014/0182194, which is incorporated herein by reference in its entirety.

In a beneficial aspect of the invention, such generated Clean Fuel Gas is suitable for use in maintaining operation of the processes of the invention at a point of use (i.e. facility employing the methods, systems, and/or processes of the present invention).

In an aspect, the exhaust gas cleaning module has a conventional particulate removal system and can be optionally equipped with a gas scrubber with solid removal. A fan can be added, if necessary, before entering the stack. In preferred embodiments, substantially all or all of the particulates are removed in the water scrubbers.

In an aspect, the invention further includes a cleaning step for the further processing of the generated fuel gas. Such step may be referred to as a "wet scrubbing" step. This step is beneficial in removing particulates from the waste source that are likely to form during the thermolysis methods and beneficially removed in the scrubbing step. For example, such a step is particularly useful in applications for the further processing when mercury-containing compounds were included in the processed waste source. Such step may also include the removal of mercury having formed a mercury halide, which may be as an insoluble halogen salt in water which is removed in the scrubber. In an aspect, the mercury halide is scrubbed out in the scrubber and thereafter disposed. In an aspect, the gas is introduced as a gas flow into a wet scrubber for purification. In an aspect, the gas scrubber(s) separate tars, oils and Biochar from the product gas flow. In a further aspect, the gas scrubber(s) can further cool the product gas, for example to a temperature below about 80° C. or even below about 40° C. The scrubber(s) may further be employed for a final removal step for any toxic compounds in the fuel gas product.

In an aspect, the produced fuel gas/water vapor mixture from the oil/water separator then enters the gas cleaning, i.e. scrubber system. In an aspect, if there are multiple reactors, each reactor line has its own first gas cleaning unit. The gas streams are combined after the first scrubber units and will enter the additional scrubbers afterwards. The scrubber systems beneficially scrub the fuel gas/water vapor mixture and vapor components undergo fractionated condensation in the scrubber system.

In an aspect, the gas cleaning units include or consist of scrubbers, vessels, pumps, oil discharge units and heat exchangers. Water combined with additives, such as for example an alkalinity source (e.g. NaOH of $Ca(OH)_2$ or similar soluble compounds) or other source such as limestone for removal of sulfur, which are known to those skilled in the art of incineration technologies. Notably, the heating methods according to the invention are distinct from incineration as external heating is provided. For clarity, the methods of the invention do not employ incineration. Those skilled in the incineration arts understand scrubbing using water containing alkaline materials to remove acidic components are distinct methods. These are used in a closed loop system to clean condensates and contaminants out of the gas stream and to cool the gas down. The condensates contain olefins, aromatics and paraffins as solids and water. The standard system includes or consists of five gas cleaning systems. This amount can be reduced or increased depending on the feedstock specifications employed according to embodiments of the invention. The scrubbed components like tar and the light oils fraction will be the feedstock of the cracking reactors. Notably the light oils are not reused and instead cracked through the cracking reactors.

In an aspect, the fuel gas is transported through the gas cleaning system by increasing the pressure, such as to about 100 mbar by ventilation systems. In an aspect, 100 mbar is the limit value for the system employed according to the invention.

In an aspect, the safety system transports the fuel gas to a flare in case of an emergency. In an aspect, all the pipelines have valves, which automatically open in case of a power failure. In a further aspect, the connecting pipes to the flare are equipped with burst discs, which will prevent excessive pressure in the reactors and the gas cleaning systems. In case of an emergency, this system will help to shut down the system in a safe manner.

Exemplary Embodiment for Processing Waste Sources to Produce Clean Fuel Gas and Char/Biochar In an aspect, a waste input material is stored in a hopper and transported by the first screw conveyor as the first drying unit, which may consist of several connected units. In an aspect, the screw conveyors are indirectly heated by the exhaust gas of the reactor gas burners after it is cooled by heat exchangers to 350° C. In an aspect, the discharge points of the water vapor are between the screw conveyors and are supported by slightly negative pressure and the vapor is collected for condensation.

In an aspect, the waste input material is fed by the last screw conveyor through an airlock system into the primary reactor unit. The first primary cracking and gasification reactions occur in this vertical reactor unit. The material is fed through the upper part of the reactor, the reactor head, and into the upper mixing chamber. The mixing chambers and the high-temperature chambers are indirectly heated through gas burners at the outer wall of the reactor. In an aspect, the material flow inside the reactor is controlled by an internal screw conveyor and a rotor unit.

In an aspect, the mixing and high-temperature chambers are enclosed by the outer burning chamber, which is heated by gas-burners capable to run on Natural Gas or the clean fuel gas generated by the systems of the invention after it is cleaned in the scrubbing system.

In an aspect, the exhaust gas of the gas burners is utilized to dry the waste input material, if the waste source needs drying. In an embodiment, the desired moisture content should be in the range of about 1-25%, or preferably from about 10-20%.

In an aspect, the produced fuel gas and the coke are ducted into the first of two secondary reactors at the bottom of the vertical reactor. In an aspect, these reactor units are nearly horizontal and are also indirectly heated screw conveyor units. Additional gasification of the material and gas reactions occurs in the secondary reactor units. They are heated by their own burner units.

In an aspect, the remaining residues are Biochar and it is discharged at the end of the second secondary reactor unit after being cooled down with steam/water. Any metals (e.g. straps, nails, screws, bolts, etc.) in the waste feedstocks will be in the Biochar and can be separated at this time.

In an aspect, additional cracking reactors are integrated in the gasification system. These are independent heated pipe reactors, which are designed to handle any tar components, which are being condensed in the first scrubber unit. The tars are being cracked and the fuel gas will be ducted back into the first secondary reactor.

In an aspect, the entire system is secured for the case of excessive pressure. Burst discs at the main gas distribution points and the reactors ensure that any gas will be ducted to a flare and being burnt. In an aspect, water vapor can be injected into the primary reactor to cool down the primary reactor and stop the gasification reactions inside the reactor.

In an aspect, the produced fuel gas/water vapor mixture enters a gas cleaning/scrubber system. Each reactor line has its own first gas cleaning unit. The gas streams are combined after the first scrubber units and will enter the additional scrubbers afterwards. In an aspect, the gas cleaning units consists of scrubbers, vessels, pumps, oil discharge units and heat exchangers. Water combined with additives are used in a closed loop system to clean condensates and contaminants out of the gas stream and to cool the gas down. The condensates contain olefins, aromatics and paraffins as solids and water. In an aspect, the system consists of five gas cleaning systems. This amount can be reduced or increased depending on the feedstock specifications. The scrubbed components like tar will be the feedstock of the cracking reactors, the light oil fraction of aromatic oil and olefins will be separated from the solids/water and reprocessed in the gasification system and the water will be pre-cleaned and reused.

In an aspect, the fuel gas is transported through the gas cleaning system by increasing the pressure to 100 mbar by ventilation systems. 100 mbar is the limit value for the whole system. In an aspect, these components are redundant and can be bypassed.

In an aspect, the safety system transports the fuel gas to a flare in case of an emergency. All the pipelines have valves, which automatically open in case of a power failure. The connecting pipes to the flare are equipped with burst discs, which will prevent excessive pressure in the reactors and the gas cleaning systems. In case of an emergency, this system will help to shut down the system in a safe manner.

Optional Additions for Enhanced Processing and Efficiency of Thermolysis Methods to Produce Clean Fuel Gas and Char/Biochar The methods of the present invention are suitable for combination with additional inputs to further maximize the efficiency of the methods and systems employed. It is known that power generation equipment is designed to perform at best efficiencies for converting the supplied fuel into power at a specified range of fuel load. This range for gas turbines and gas engines is generally in the 80% to 100% fuel gas capacity of the selected gas turbine or gas engine. Efficiency is determined as thermal energy required in the fuel gas to generate power and provided by the vendors in BTU/kWh valid for the specified range of 80% to 100% capacity fuel gas load of their equipment. As one skilled in the art will ascertain, fuel gas loads of <80% will decrease the efficiency of converting the thermal energy of the fuel gas into power.

According to optional embodiments of the invention, the clean fuel gas source output according to the methods can be further enhanced and/or stabilized to a constant output, such as measured on a cf/m (cubic feet per minute) and the heating value of the clean fuel gas source constantly controlled in BTU/cu.ft. The quantity and the heating value of the clean fuel gas source are dependent on the feedstock properties processed according to the embodiments of the invention. A homogenous feedstock Input into the reactors will yield a consistent clean fuel gas source Output for both parameters: cfm and heating value per cu.ft. supplied to a gas turbine/engine. Fluctuations in the feedstock will change the quantity of the generated clean fuel gas source and its heating value per cu.ft. According to various embodiments where distinct waste sources are employed the clean fuel gas output will be varying according to cubic feet per minute and BTU/cu.ft.

Generated Outputs of the Thermolysis Methods

In an aspect, the methods, systems, and/or processes convert the waste sources into a Char/Biochar and a Clean Fuel Gas source. Beneficially, the Clean Fuel Gas source generated typically contains at least about 15 wt-% hydrogen, between about 15 wt-% to about 40 wt-% hydrogen, or between about 20 wt-% to about 35 wt-% hydrogen in a gas generated from carbon-based feed stocks, and this quantity of hydrogen may be further increased depending on the process conditions. As one skilled in the art will appreciate the higher the hydrogen concentration in the Clean Fuel Gas source the more efficient the separation process will be, which will vary for each feedstock or mixture.

The hydrogen in the Clean Fuel Gas source will be contaminated with various other gases and components, such as described in the Examples herein from the treatment of waste sources. In aspects the Clean Fuel Gas source having at least about 15 wt-% hydrogen will also include carbon dioxide, and will require a further separation step to separate the hydrogen from the Clean Fuel Gas as described herein.

The hydrogen can be separated from the remainder of the gas using, for example, a suitable membrane and further processing, to produce a highly purified gas having at least about 95% hydrogen, at least about 96% hydrogen, at least about 97% hydrogen, or at least about 98% hydrogen. The various membranes can separate the carbon dioxide (and other components) as a result of the polar molecules separating when passed through the membrane. The separate step through a membrane can be under high temperature and/or pressure conditions. In an aspect, a pressure of about 150-325 bar is applied. One or more separation steps to obtain the desired purity level for the hydrogen can be performed.

Beneficially, the remainder gas may still be used as a source of energy in, for example, gas turbines, Internal Combustion engines, gas burners, to power the thermolysis system, etc. This purified hydrogen gas may then be reacted with nitrogen to form ammonia, without the production of greenhouse gases or high energy consumption. Moreover, the hydrocarbon materials from the waste input are converted to the Clean Fuel Gas while the other materials are collected as Char/Biochar. As a further benefit, any oils and tars created are recycled into the secondary reactor(s) and cracking reactor(s) to be converted into additional fuel gas, such as may be employed to maintain operation of the processes of the invention at a point of use (i.e. facility employing the methods, systems, and/or processes of the present invention).

Clean Fuel Source

The methods according to the invention employing the thermolysis methods beneficially provide a clean fuel gas source. As referred to herein, the clean fuel gas source can also be termed a syngas or synthesis gas (i.e. mixture of hydrogen, carbon monoxide, additional $C_1$-$C_4$ aliphatic hydrocarbons and carbon dioxide). This fuel gas source can also be used to create a liquid biofuel. In an aspect, the fuel gas source is a clean, non-hazardous material. In an aspect, the fuel gas source is substantially-free of toxic chemicals. In an aspect, the fuel gas source is substantially-free of halogen compounds. In a further aspect, the fuel gas source is substantially-free of or free of toxic chemicals and halogen compounds. In an aspect, the fuel source is substantially-free or free of creosote components, polycyclic aromatic hydrocarbons (PAHs), including chlorine phenols, halogenated dibenzodioxins, halogenated dibenzofurans, biphenyls, and/or pyrenes.

In an embodiment, the fuel gas generated can be at least partially utilized for heating the reactor(s) for the system and methods of the thermolysis methods of the invention. In an aspect, the heat for the reactor(s) is supplied by about 10-50% of the generated fuel gas, about 10-40% of the generated fuel gas, or about 20-30% of the generated fuel gas.

In an embodiment, the fuel gas generated has a composition substantially as set forth in the Tables in the examples below.

In an aspect, the fuel gas is a superior product because no air or external oxygen introduced into the reactors, such as is common in pyrolysis and/or partial oxidation systems.

In an embodiment of the invention the thermolysis of the waste sources provide from about 3,000 BTU per pound (equivalent to 6,978 kj/kg), from about 6,000 BTU per pound, from about 6,400 BTU per pound, or up to about 7,700 BTU per pound or greater of the waste source (e.g. values for treated wood waste source), producing a Clean Fuel Gas as an energy source. Again, with an example of the treated wood waste source, processing of a single railroad tie (i.e. exemplary treated wood waste source) having approximately 20 wt.-% chemical components provide approximately 1.4 million BTU. This unexpectedly high BTU is approximately equivalent to approximately 125 pounds of coal, demonstrating the beneficial effects of processing waste sources according to the invention. As one skilled in the art will ascertain based on the disclosure of the invention set forth herein, differences in types of extent of chemical treatment of the wood will impact the BTUs per pound.

Generating Green Ammonia from Clean Fuel Gas Source

In an aspect, the Clean Fuel Gas source generated from the processing of the waste sources provides a hydrogen rich gas. Beneficially, the Clean Fuel Gas source generated typically contains at least about 15 wt-% hydrogen, between about 15 wt-% to about 40 wt-% hydrogen, or between about 20 wt-% to about 35 wt-% hydrogen in a gas generated from carbon-based feed stocks (i.e. the Clean Fuel Gas), and this quantity of hydrogen may be further increased depending on the process conditions. The methods include at least two steps for the production of the ammonia form the Clean Fuel Gas source, wherein first the hydrogen is separated from the remainder of the gas using, for example, a suitable membrane and further processing, to produce a highly purified gas having at least about 95% hydrogen, at least about 96% hydrogen, at least about 97% hydrogen, or at least about 98% hydrogen, and second the hydrogen is reacted with a nitrogen source to produce the ammonia.

In an embodiment the generation of ammonia from the hydrogen of the Clean Fuel Gas does not generate any greenhouse gases ($CO_2$). Instead, the process uses power (via electrolysis).

There are various known methods for obtaining hydrogen from gas sources, including generating and purifying hydrogen, using a variety of starting materials. For example, hydrogen may be generated from methanol using a methanol reforming catalyst alone or in conjunction with a hydrogen-generating shift reactor. In a preferred embodiment, the hydrogen is separated by traditional membrane processes to produce at least about 95% hydrogen, at least about 96% hydrogen, at least about 97% hydrogen, or at least about 98% hydrogen as a pure gas.

The following are examples of technologies to obtain hydrogen that could be applied to the methods descried herein for obtaining hydrogen from the Clean Fuel Gas source: U.S. Pat. No. 4,175,115, herein incorporated by reference in its entirety, discloses the production of synthesis gas by contacting methanol in the vapor phase with a catalyst that is a supported Group VIII metal. The metal may be used alone or in combination with one or more other metals from Groups I to VIII, excluding binary combinations of copper and nickel. Anhydrous methanol is preferably used since the presence of water makes the efficient production of a carbon monoxide and hydrogen mixture much more difficult. On the other hand, the methanol may be diluted with carbon monoxide, carbon dioxide or hydrogen. The feed may be diluted with recycled carbon monoxide and hydrogen.

U.S. Pat. No. 4,316,880, herein incorporated by reference in its entirety, discloses a process for producing carbon monoxide and hydrogen by contacting methanol vapor with an indirectly heated zinc containing catalyst. The carbon monoxide is separated from the hydrogen by using adsorbers containing zeolite-type molecular sieves that allow the hydrogen to permeate through and sorbs the carbon monoxide. Water is minimized in the methanol to not in excess of 20 percent by weight to minimize the carbon dioxide content in the effluent.

U.S. Pat. No. 4,780,300, herein incorporated by reference in its entirety, discloses a process for reforming methanol by cracking 100 moles of methanol in admixture with 1 to 99 moles of water, thereby obtaining a gas containing hydrogen and carbon monoxide. Therefore, less than stoichiometric quantities of water are used. The process is preferably carried out using a catalyst that consists of a carrier comprising copper and chromium oxides with or without magnesium oxide and/or barium oxide and a catalytic component of nickel oxide or a mixture of nickel oxide and a basic oxide.

U.S. Pat. No. 6,171,574, herein incorporated by reference in its entirety, discloses catalytic steam reforming of methanol and similar fuels to generate hydrogen. The hydrogen is purified by its permeation through a selective membrane. These two processes are linked by bounding a longitudinal tortuous flow path of a methanol reformate by a thin palladium-bearing membrane. The methanol reformate contains hydrogen, oxides of carbon, steam and methanol. The flow path contains a turbulence inducing material, in one case the methanol reforming catalyst crushed to a uniform sieve size. In addition to methanol, hydrogen may be generated from a hydrocarbon, e.g., natural gas, using a hydrocarbon reforming catalyst.

U.S. Pat. No. 5,653,774, herein incorporated by reference in its entirety, discloses a nickel containing reforming catalyst and a process using same wherein a hydrocarbyl compound, e.g. natural gas, is reformed using an oxygen-containing compound, e.g., molecular oxygen or carbon dioxide. Steam may be added when carbon dioxide is used to reduce coking of the catalyst so that deactivation does not occur. The amount of water as steam is preferably about 10 to 50 percent of the feed gases.

U.S. Pat. No. 5,855,815, herein incorporated by reference in its entirety, discloses a process for producing synthesis gas containing carbon monoxide and hydrogen from the reduction of carbon dioxide with natural gas or a lower hydrocarbon having methane as the main component and oxygen and steam over a catalyst. The catalyst is composed of nickel and, as promoters, alkali metal and alkaline earth metal component supported on silicon-containing support. The support has a high surface area and may be a zeolite, silica, silicate or silica-alumina which are stable under the reaction conditions disclosed therein. The objective of the process is to produce a synthesis gas having a low ratio of hydrogen to carbon monoxide from carbon dioxide and hydrocarbon by using inexpensive Ni catalyst.

U.S. Pat. No. 6,048,508, herein incorporated by reference in its entirety, discloses a process for simultaneously obtaining pure carbon monoxide and pure hydrogen in a steam reformer plant for hydrogen or ammonia generation. Natural gas is fed to the steam reformer plant that has a primary reformer, a secondary reformer and downstream thereof, a CO conversion stage. A portion of the syngas stream discharged from the second reformer is treated to remove the carbon monoxide and a major portion of the steam contained therein to produce a pure CO stream. The thus treated syngas stream is combined with the remaining portion of the syngas stream discharged from the second reformer prior to entering the CO conversion stage, which is a hydrogen-generating shift reactor, wherein the carbon monoxide and water are converted into carbon dioxide and hydrogen.

Other methods of hydrogen manufacture are discussed in U.S. Pat. No. 6,599,491, herein incorporated by reference in its entirety, which teaches the converting of an existing methanol plant to make hydrogen and optionally methanol and U.S. Pat. No. 4,409,196, herein incorporated by reference, which teaches a process ultimately for generating ammonia, and producing hydrogen by oxidizing oil, coal, and/or natural gas at high temperatures and pressures.

In an embodiment the hydrogen is separated and purified. Purified hydrogen has a majority of or all impurities removed. In embodiments, the hydrogen has at least about 95% purity, at least about 96% purity, at least about 97% purity, at least about 98% purity, or at least about 99% purity. Removal of impurities can include methods of conventional adsorption, physical adsorption and chemical reactions which are effective for purification. The removal of impurities can also include a separation step, such as using a pressure swing adsorption (PSA) unit, or distillation (i.e. separation based on boiling points). In some embodiments, separation is most feasible at large scales and with continuous operation, although it is employed in some industrial ammonia synthesis plants (i.e. the PURIFIER technology, which is used to get rid of anything else than $H_2$ and $N_2$ for the ammonia synthesis loop).

As one skilled in the art will ascertain from the disclosure herein, the separation and purification of the hydrogen is preferably at least >95%. However, in embodiments where less than about 95% purity is obtained, additional repurification steps can be employed to utilize the hydrogen as a source for production of the ammonia.

The separation of hydrogen can also include physical adsorption and polymer membrane processes, which are also applicable to hydrogen recovery from crude hydrogen mixed with hydrocarbons. Membranes selectively permeate $H_2$ through the membrane (i.e., separation based on the size of the molecule and the affinity with the membrane material), thereby achieving a reasonable separation of $H_2$ and $CH_4$. As one skilled in the art will ascertain, membranes operate at a wide range of temperatures and pressures, and a detailed screening is required to choose the best option (stability, selectivity, activity). Exemplary membranes include high temperature palladium membranes with high selectivity, and lower temperature membranes like Kevlar. A further example of a preferred membrane is Prism Separators/Prism Technologies from Air Products. In an embodiment, membrane separation of $H_2$ provides at least about 90% purity, or at least about 95% purity, or at least about 99% purity of the $H_2$ and $CH_4$ components. In some embodiments, membrane separation can also be combined with a sorbent for the removal of $CH_4$ from the $H_2$ product to provide at least about 95% purity, at least about 96% purity, at least about 97% purity, at least about 98% purity, or at least about 99% purity of the $H_2$ and $CH_4$ components. As referred to herein sorbents can include, for example, activated charcoal in fine particle sizes, pelletized organic material (e.g. compressed corn cobs), or other fiber or carbon granulates for surface adsorption.

The separation of hydrogen can still further include low temperature cryogenic processes. The separation of hydrogen can still further include use of hot alkaline absorption and conventional adsorption processes are available for removal of carbon dioxide and water vapor and other species. Additional disclosure of hydrogen separation methods that can be employed to remove hydrogen from the Clean Fuel Gas source generated from the thermolysis methods are set forth in Energy Carriers and Conversion Systems, Vol. 1 (available at http://www.eolss.net/Eolss-sampleAllChapter.aspx), which is herein incorporated by reference in its entirety.

In an aspect that is preferred for the methods, systems, and/or processes of the present invention the processing steps to produce green ammonia from the Clean Fuel Gas source preferably include pressurizing the Clean Fuel Gas source to pressures, including for example, between about 100 and 500 bar, between about 125 and 400 bar, and preferably between about 140 and 325 bar, and passing it through a membrane to separate hydrogen and $CO_2$ from the Clean Fuel Gas (which comprises methane, CO, and other $C_1$-$C_4$ hydrocarbons in the gas) to remove fuel gas ($C_nH_m$ and CO) from the system and form the Clean Fuel Gas. In aspects this also includes the separation of hydrogen from $CO_2$ through pressure swing adsorption, including for example, at pressures from about 100 to about 750 pounds per square inch, or preferably about 130 to about 600 pounds per square inch to maximize adsorption of $CO_2$ on the adsorbent material. As one skilled in the art will ascertain, depending on the gas composition, multiple adsorbent materials can be used. In aspects, then the pressure is reduced to about atmospheric pressure to desorb the unwanted $CO_2$. Beneficially, the $CO_2$ removed from the system can be sold commercially for multiple uses. The pressure swing adsorption relies on the different adsorption/release properties between $H_2$ and $CO_2$ to separate the gases. The hydrogen is weakly adsorbed hence can be extracted to be used in making ammonia. Moreover, the separated fuel gas can then be used in various applications to generate electricity or used to make steam or as process heat.

Beneficially the methods for separating the hydrogen from the Clean Fuel Gas can eliminate numerous steps that are conventionally used in an ammonia product process. In an aspect, the methods for separating hydrogen from the Clean Fuel Gas and generating natural gas do not include one or more of the following steps: desulfurization, use of reformers (i.e. primary and/or secondary reformers), high/low temperature reactors, isothermal shift reactors and methanation steps. Instead, the Clean Fuel Gas source passes through the membrane and/or pressure swing adsorption steps to remove the hydrogen to be supplied to the ammonia synthesis steps. This is different than the conventional ammonia production process and/or Linde ammonia production process, such as disclosed in Pattabathula & Richardson, Ammonia Production, AIChE 2016, which is herein incorporated by reference in its entirety.

The hydrogen gas is then reacted with nitrogen to form ammonia, beneficially without the production of greenhouse gases or high energy consumption. The nitrogen is provided in the form of nitrogen from the air (e.g. use of nitrogen units to extract nitrogen from the air) to form the green ammonia without the production of greenhouse gases. In order to generate ammonia, purified hydrogen gas is combined with nitrogen using the Haber-Bosch process. Such as shown in FIG. 3, atmospheric nitrogen is obtained with a nitrogen unit and then is converted to ammonia. The Haber-Bosch process is the most important method of nitrogen fixation, but as discussed herein, this process is associated with major environmental concerns due to its use of fossil fuel feedstocks and high energy consumption. The Haber-Bosch ammonia synthesis is the premier example of industrial nitrogen fixation. This process reacts hydrogen and nitrogen at high temperatures and pressures, in the presence of an iron catalyst to produce ammonia, according to Formula I:

Based on ultraviolet photoelectron spectroscopy and X-ray photoelectron spectroscopy Studies, the following mechanism has been proposed for the formation of ammonia, whereby the nitrogen can be adsorbed on an iron surface in both the atomic and molecular states.

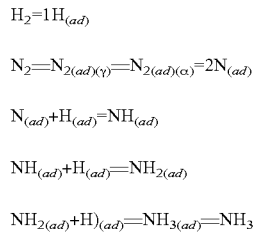

Unfortunately, typical operating temperatures and pressures are in the range of 400-550° C. and 100-1000 atm (wherein 1 atm=1.01325 bar), respectively, thus rendering this process extremely dangerous. In addition, the process creates between about 2-2.5 tons of $CO_2$ for every ton of ammonia; this is the highest greenhouse gas production for any of the commercial chemicals produced. Additionally, the necessary equipment for this process is very large and expensive. Several modifications of the Haber-Bosch process, such as the Kellogg Ammonia Process, the TopSoe Ammonia Process, the ICI AMV Ammonia Process, and the Braun Purifier Process, have attempted to address these concerns, and have succeeded in increasing efficiency while modestly lowering the temperatures and pressures required (350-470° C., 70-105 bar). Further discussion of these methods is provided in C. Hooper, CATALYTIC AMMONIA SYNTHESIS, (J. R. Jennings, Ed.) 1991, which is herein incorporated by reference in its entirety. However, these processes still operate at very high temperatures and pressures and the equipment involved is still very specialized, large, and expensive. The methods according to the invention significantly improve upon these methods to react the hydrogen with nitrogen without producing greenhouse gases and/or high energy consumption.

In an embodiment of the invention, the methods for synthesizing ammonia using the Haber-Bosch process will include combining the hydrogen and nitrogen at a pressure range between about 100-300 bar, and temperature up to about 500° C. In embodiments lower temperatures and pressure may be achieved. However, despite the need for elevated temperature and pressure, the generation of ammonia eliminates the conventional steps of reforming methane/coal or oil, the conversion of $CO+H_2O$ to $H_2+CO_2$ and then the acid gas removal that results in significant $CO_2$ released.

As described herein the steps to combine the separated hydrogen with nitrogen from the air undergo a heated and pressurized reaction to form the ammonia ($NH_3$). This green ammonia can then be added (e.g. piped) into a cooled tank to create a liquid ammonia.

Generating Natural Gas from Clean Fuel Source

Beneficially, the methods of separating the hydrogen from the Clean Fuel Gas source provide a green natural gas source suitable for various applications of use. The gasses—hydrogen, carbon monoxide, carbon dioxide and methane—in the Clean Fuel Source provide a bountiful source of hydrogen to separate and result in natural gases. In particular, the separation of hydrogen from carbon dioxide ($CO_2$) provides a preferred pathway for separation of the hydrogen to produce the natural gas. The natural gas provides BTUs for various applications of use and provides a valuable energy output from the methods described herein.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

The disclosure of each reference set forth herein this patent application is incorporated herein by reference in its entirety.

Example 1

Systems and apparatus for processing treated wood. Apparatus and processing system for treated wood waste sources were evaluated at a pilot plant in Forst, Germany for the assessment of product features and material balances as disclosed pursuant to the embodiments of the invention. The methods according to the invention were evaluated to confirm gas output having a suitable composition with high methane, hydrogen and carbon monoxide content for further usage, and all toxic chemical compounds were removed (and no other toxins generated) by the thermolysis system. The methods according to the invention were evaluated to confirm complete destruction of VOCs and other toxic components, along with the measurement of any potentially hazardous components and VOCs to assess suitability of the processes for use in factories. The mass balances were also assessed to determine whether the resulting Biochar can be safely utilized as a soil amendment.

Description of the input material. The material was waste wood, which contained creosote as a pollutant. The wood also contained utility poles which had PCP, CCA and other preservatives. Metal parts were also included, e.g. eyelets for transport ropes and screws. An attempt was made to eliminate the metal parts before feeding them into the plant. Due to the creosote load, the material was very odor-intensive. The density of the material corresponded to that of wood. The humidity was over 20%. Due to the coarse material, which was strongly compressed during conveying, the residual material remaining in the reactor and system from previous experiments was removed and carried along. The metals and other residues in these material residues which cannot be chemically converted are discharged mixed with the resulting coke. This means that the discharge of residual residues from the previous tests must be taken into account when assessing the coke analyses. The material handling for the test was coordinated with the customer and the infeed technology for the test was adjusted. After start-up of the plant, continuous plant operation was carried out with step-by-step material feed in measured quantities and periodic product removal.

Parameters of the test operation. Railroad ties at 'end of life' (average of 40 years or more of age) were obtained for evaluation. The feedstock had been shredded to <2 inches for the test. The reactor substantially as depicted in FIG. 1 had been cleaned before the test. Process software and sensors were adjusted to record the operating conditions. The material handling and infeed conditions were adjusted before the test. Technical adjustments for this specific feedstock were implemented as outlined below.

Continuous processing. A continuous plant operation was conducted after heating the system up with controlled feedstock input and product discharge. The operating parameters were adjusted to the requirements of the feedstock. The resulting materials and media were sampled and documented. A total of two gas samples, a feedstock sample from each feedstock type and a Biochar sample were obtained for further analysis. The analysis of the samples was carried out by a certified independent laboratory.

General conditions. The feedstock had been shredded and was fed according to the test protocol. The start-up process included the heating of the reactors and the adjustments of the gas scrubbing units and adjacent plant components. The operating conditions were adjusted to the test plant as outlined below.

Plant conditions. The plant operation during the test used the standard configuration of the system and used specific adjustments for this feedstock—These adjustments included:

Plant operation with the lower (one) burner only;

Feedstock infeed as infeed chamber emptied (although this would not be a required limitation in a commercial size plant employing the methods and processes of the invention);

Reactor conditions with temperatures of 450° C. to 800° C. at the reactor top and 400° C. to 800° C. at the lower parts of the reactor;

Pressure levels of the system was increased between 5 mbar and 100 mbar;

Steam generation via heat exchanger and injection of the process steam through pipelines directly into the reactor head to increase moisture content to about 10% to improve gasification process of the low-density input by increasing moisture content of the feedstock;

Cracker-module for generated condensates (e.g. light oils) was not in operation, because the volume of these oils was too low for an efficient operation;

The product gas was piped from the reactor to the gas cleaning units;

The condensates were scrubbed out in the gas cleaning units from the generated gas. Oily components (oligomers) were generated from both feedstock samples, which were completely condensed in scrubbing unit 2. The oily components from the wood feedstock passed through Scrubber 1 due to its operating conditions. A small fraction of the oily components from the feedstock was scrubbed out in unit 1. A decrease in the scrubbing media temperature is required to achieve a nearly complete condensation of these components in Scrubber 1. The condensates show a high density due to a high fraction of oligomers. No oily components were recorded in Scrubber 3 and only water from the gas fraction was condensed in Scrubber 3. The control valves in the gas piping system recorded also no condensates from the gas. The gas cleaning operational parameters and conditions were not changed for both tests and the system operated as expected. Beneficially, this shows all oils and tars were recycled and converted into additional Clean Fuel Gas source.

Water was added to gas scrubber 1 although level equalization was not required, and controlled oil separation and condensation occurred); and The operation of the gas scrubbers was carried out without recirculation; Level control in scrubber 1 and 2 by manual adjustments of the correct level; and Control of the oil water separator between the scrubbers and the gas pipeline of the plant during operation.

No recirculation and injection of the generated oils from scrubbers 1 and 2. The low amount of oil components was removed from scrubbers 1 and 2 and collected.

The level control of the media during operation were adjusted constantly to its range level. Media in the first scrubber: oil, Media in the following scrubbers: water with additives. All generated media were removed after the test and measured for the mass balance.

Analysis methods. The feedstock material and the Biochar were sampled. The gas samples were collected in glass probes and shipped for analysis to an external certified laboratory. Only small volumes of oil-oligomers-tar mixture were created at the selected temperatures for the gasification of the wood crosstie and pole feedstocks and were removed after scrubbing. The mixture is separated by an internal oil-water separator and the light fraction will be converted to gas in the cracking reactor, the heavy fraction with the tars piped into the bottom of the first reactor for reprocessing in a commercial unit.

Test Results. Table 1 shows the summary input during the test.

TABLE 1

| Standard plant operation | |
|---|---|
| Total Input | 170 kg |
| Average throughput | 34 kg/hr. |

Figure 4:
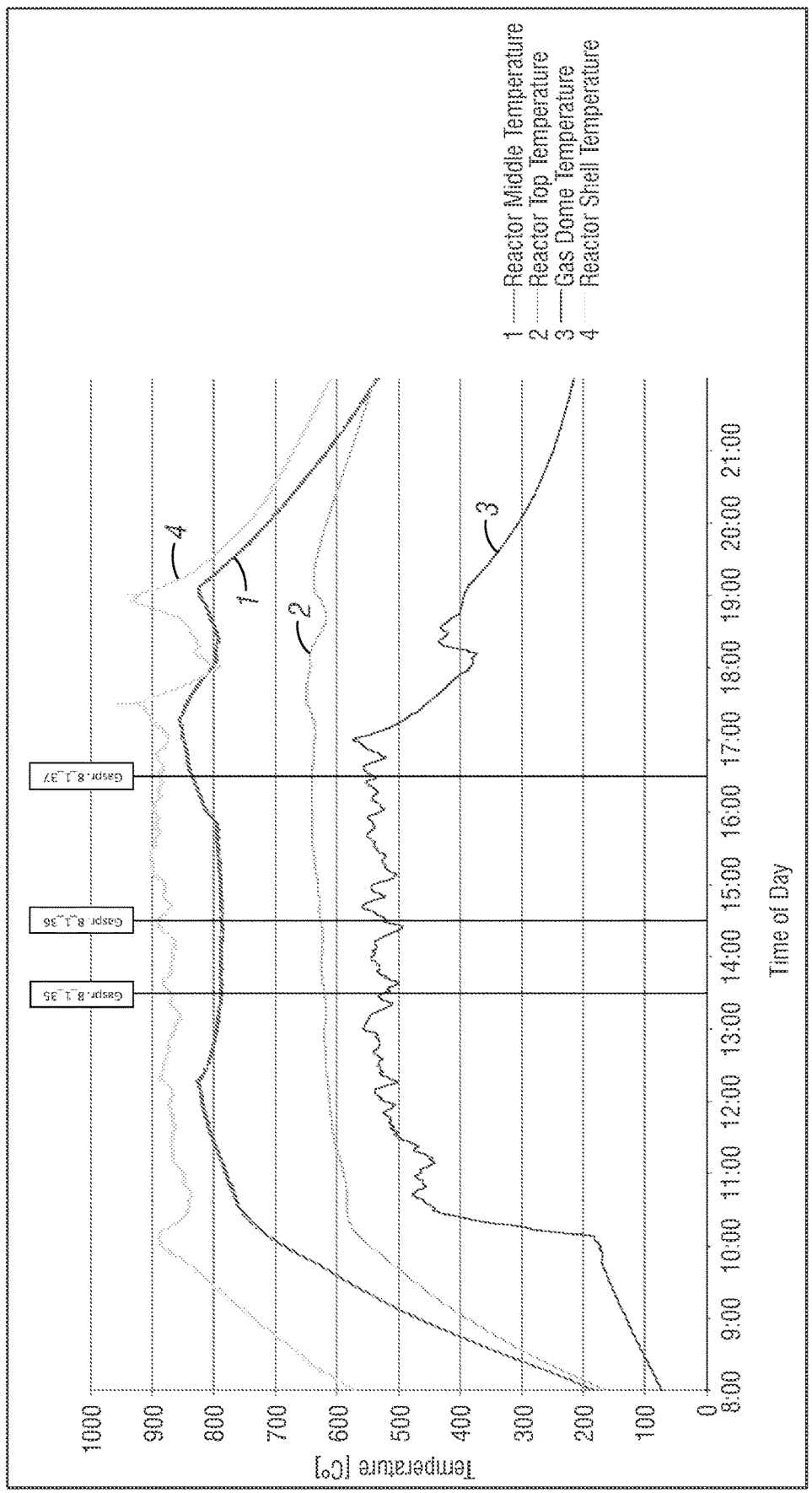
FIG. 4 shows temperature measurements from exemplary waste, a treated wood waste source, for processing according to the methods, systems, and/or processes of the present invention.

Temperature data for the temperature of the reaction from the start of the processing to the end of the test is depicted in FIG. 4. The temperature measurements (measured in degrees Celsius) show the temperatures in different parts of reactor (e.g. middle reactor, top of the reactor, gas dome of reactor and the reactor shell). The samples at various times provide an average temperature of the reaction.

Figure 5:
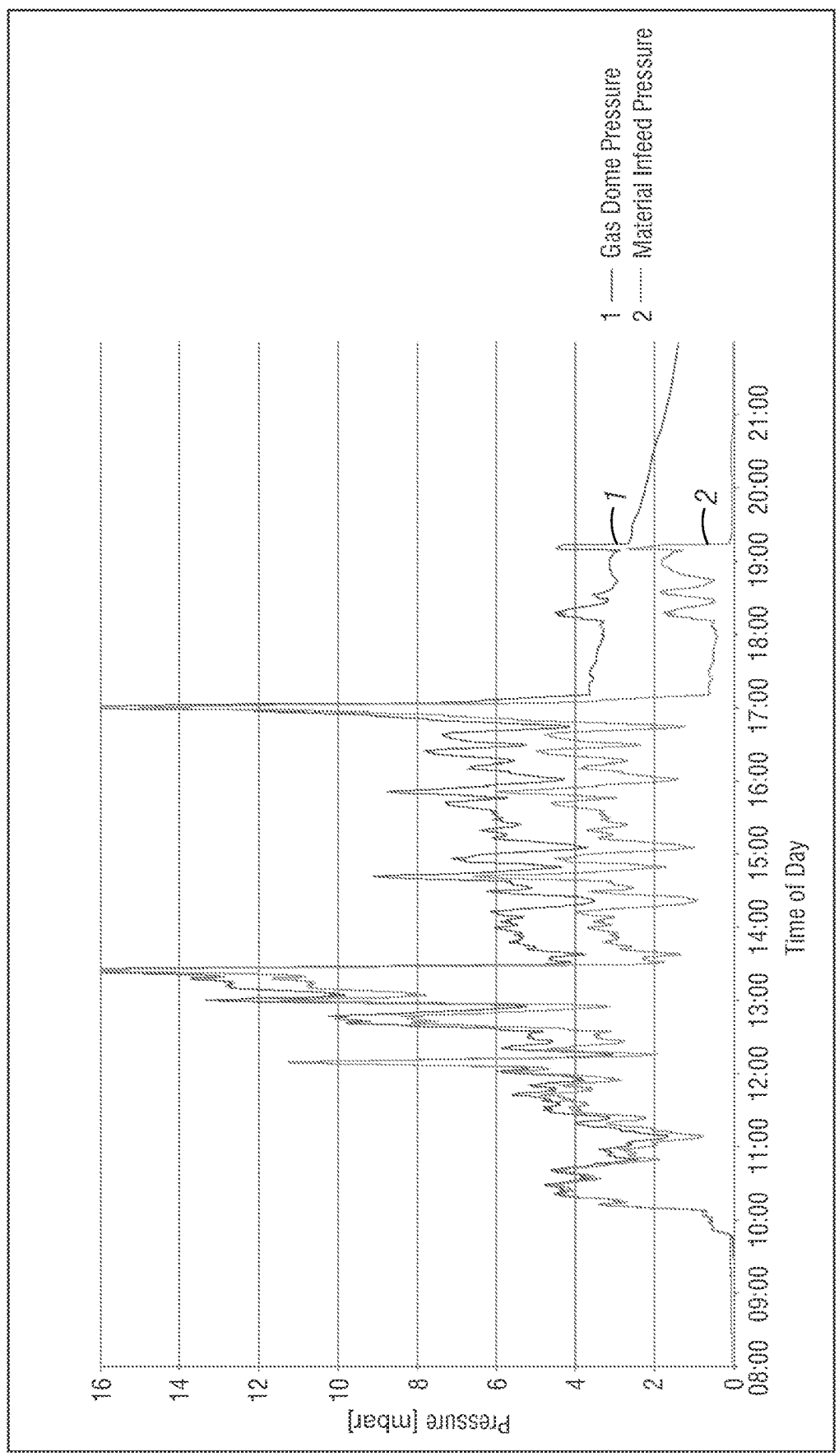
FIG. 5 shows pressure measurements from exemplary waste, a treated wood waste source, for processing according to the methods, systems, and/or processes of the present invention.

As the treated wood waste sources do not have a large amount of fine particles in the feedstock there is not an immediate gasification in the reactor—this is shown in FIG. 5 by no immediate (short term) pressure spikes inside the reactor immediately after feeding new material. FIG. 5 instead shows the varying fluctuations in pressure by the varying amounts of material entering the reactor. Notably, the pressures are low, approximately 0.2 PSI at the highest pressure measurement (16 millibar is equal to 0.23 PSI). The pressures measured are at the gas dome and the material Infeed (material entrance into the main reactor).

TABLE 2

| | Input | | Output | | |
|---|---|---|---|---|---|
| | Input | Steam | Gas | Oils and tars | Char | Water |
| Mass [kg] | 170 kg Input, incl. 39.5 kg Water (Moisture) | 22.5 | 89 | Fed back to Cracker | 38 | 60 |

The balance sheet shown in Table 2 shows a deficit due to minor errors in the measurement data. The quantity of gas produced is approximately 50% of the input quantity of the moist material. Related to the mass of wood without moisture content (dry basis), the value is approx. 65%. From the moisture of the material a part of the coke was converted into product gas. The analysis of gas is shown in Table 3 where the gas samples were taken at different times during the testing to show an "average" gas composition for the test. These values serve to provide the energy content of the syngas (i.e. its heating value).

TABLE 3

| Main components [Vol-%] | Gas_8_1_35 | Gas_8_1_36 | Gas_8_1_37 |
|---|---|---|---|
| $H_2$ | 28.5 | 27.3 | 43.0 |
| $O_2$ | 0.22 | 0.41 | 0.38 |
| $N_2$ | 0.86 | 2.0 | 1.3 |
| $CH_4$ | 14.6 | 13.8 | 12.2 |
| CO | 29.4 | 33.5 | 22.8 |
| $CO_2$ | 20.3 | 17.0 | 16.5 |
| Ethane | 0.97 | 1.0 | 0.39 |
| Ethene | 2.7 | 2.6 | 1.4 |
| Propane | 0.26 | 0.26 | 0.1 |
| Propene | 2.1 | 2.0 | 1.8 |
| i-Butane | <0.01 | <0.01 | <0.01 |
| n-Butane | <0.1 | <0.1 | <0.1 |
| Mol weight | 22.5 | 22.4 | 18.4 |
| Density [kg/m$^3$] | 1.0 | 1.0 | 0.8 |
| Heating value [kWh/m$^3$] | 4.6 | 4.6 | 4.1 |
| Wobbe Index [kWh/m$^3$] | 5.2 | 5.2 | 5.1 |

The analysis of the Clean Fuel Gas source show it is a viable source of hydrogen for reacting with nitrogen to form ammonia. The Biochar was also analyzed and confirmed to be substantially-free of polycyclic aromatic hydrocarbons, dioxins and furans.

Example 2

Evaluation of Various Waste Sources for Processing and Energy Content of Resultant Clean Fuel Gas Source. A comparison of the feedstock, including plastics, carpet, polyester (PET), tires, auto shredder residue (ASR), municipal solid waste (MSW), and the respective outputs utilizing the thermolysis processing according to the invention are provided in Tables 4-6.

TABLE 4

| Main Components [Vol-%] | Plastics | Carpet | PET | Tires | ASR | MSW | Average |
|---|---|---|---|---|---|---|---|
| $H_2$ | 24.2 | 20.0 | 21.6 | 29.9 | 24.0 | 29.4 | 24.8 |
| $O_2$ | 0.7 | 0.3 | 0.0 | 0.6 | 0.0 | 0.0 | 0.3 |

TABLE 4-continued

| Main Components [Vol-%] | Plastics | Carpet | PET | Tires | ASR | MSW | Average |
|---|---|---|---|---|---|---|---|
| N$_2$ | 2.3 | 2.7 | 0.0 | 2.9 | 0.0 | 0.0 | 1.3 |
| CH$_4$ | 36.0 | 35.7 | 18.7 | 44.1 | 24.8 | 30.1 | 31.6 |
| CO$_2$ | 13.1 | 12.9 | 21.9 | 4.2 | 10.4 | 10.8 | 12.2 |
| CO | 13.9 | 12.8 | 31.1 | 2.9 | 22.6 | 11.3 | 15.8 |
| Ethane | 2.9 | 3.8 | 1.2 | 3.9 | 3.0 | 3.6 | 3.1 |
| Ethylene | 5.0 | 7.7 | 4.9 | 8.0 | 9.0 | 12.6 | 7.9 |
| Propane | 0.3 | 0.6 | 0.0 | 0.6 | 2.2 | 0.1 | 0.6 |
| Propene | 1.5 | 3.3 | 0.6 | 2.6 | 4.0 | 2.1 | 2.3 |
| i-Butane | 0.0 | 0.0 | 0.0 | 0.1 | 0.0 | 0.0 | 0.0 |
| n-Butane | 0.1 | 0.1 | 0.0 | 0.2 | 0.0 | 0.0 | 0.1 |
| Percent | 100 | 100 | 100 | 100 | 100 | 100 | 100 |

TABLE 5

| Main components | Pine [Vol-%] | Ash [Vol-%] | Eucalyptus [Vol-%] | RR Ties (Oak) [Vol-%] |
|---|---|---|---|---|
| H$_2$ | 26.21 | 25.47 | 31.85 | 27.43 |
| O$_2$ | 0.46 | 0.31 | 0.35 | 0.35 |
| N$_2$ | 1.53 | 1.10 | 0.85 | 1.23 |
| CH$_4$ | 15.44 | 13.76 | 13.35 | 14.63 |
| CO$_2$ | 22.81 | 26.42 | 22.40 | 21.87 |
| CO | 28.91 | 28.37 | 27.30 | 30.10 |
| Ethane | 1.07 | 0.94 | 0.81 | 0.92 |
| Ethene | 3.13 | 3.20 | 2.70 | 3.09 |
| Propane | 0.03 | 0.02 | 0.02 | 0.02 |
| Propene | 0.43 | 0.42 | 0.36 | 0.36 |
| i-Butane | 0.00 | 0.00 | 0.00 | 0.00 |
| n-Butane | 0.00 | 0.00 | 0.00 | 0.00 |
| Total | 100 | 100 | 100 | 100 |
| BTU/ft$^3$ | 415 | 392 | 394 | 409 |

TABLE 6

| Main Components [Vol-%] | Printed wiring boards (PWB) | Printed wiring boards (PWB) |
|---|---|---|
| H$_2$ | 36.4 | 34.1 |
| O$_2$ | 0.30 | 0.31 |
| N$_2$ | 1.70 | 1.9 |
| CH$_4$ | 22.2 | 22.5 |
| CO$_2$ | 11.2 | 10.3 |
| CO | 20.8 | 21.5 |
| Ethane | 0.66 | 1.0 |
| Ethene | 2.5 | 2.6 |
| Propane | <0.01 | 0.01 |
| Propene | 0.06 | 0.15 |
| i-Butane | <0.01 | <0.01 |
| n-Butane | <0.01 | <0.01 |
| Heating value [kWh/m$^3$] | 4.8 | 4.9 |

The variations in gas compositions for the different waste sources show that processing of various waste sources provide at least about 20 wt-% hydrogen for separation.

Example 3

Additional processing to generate ammonia will be conducted to process treated wood waste sources, plastic waste sources and/or tire waste sources according to the methods substantially set forth in Example 1 to capture the gas produced. A dual membrane extraction will be used to remove the hydrogen in stages to provide at least a 95%+ purity level of the separated hydrogen. The separated hydrogen will be piped into a holding tank that is pressurized and then piped into a compressor before transferred into a Haber Bosch processing unit. This will combine the separated hydrogen with nitrogen from the air and then the heated and pressurized process will form the ammonia. The final green ammonia will be piped to a cooled tank to create a liquid ammonia.

The various embodiments being thus described, it will be apparent that the same may be varied in many ways. Such variations are not to be regarded as a departure from the spirit and scope of the inventions and all such modifications are intended to be included within the scope of the following claims. The above specification provides a description of the manufacture and use of the disclosed compositions and methods. Since many embodiments can be made without departing from the spirit and scope of the invention, the invention resides in the claims.

What is claimed is:

1. A method for converting a waste source into green ammonia and Clean Fuel gas comprising:
    thermolyzing a waste source in a thermolysis system; wherein the thermolysis system comprises a primary reactor and at least a secondary reactor, said reactors having a process temperature between about 300° C.-1000° C., at least two gas scrubbers, an oil/water separator, and an oil/tar cracker;
    destroying and/or removing toxic compounds comprising inorganic and/or organic preservatives present in the waste source;
    generating outputs of the thermolysis system comprising Clean Fuel Gas, Char and/or Biochar, wherein the reactors generate tars and oils which are thereafter separated from the Clean Fuel Gas in the gas scrubbers, thereafter, cracked in the oil/tar cracker, and sent back to the secondary reactor to generate more of the Clean Fuel Gas and no tars and oils remain in the outputs, wherein the Clean Fuel Gas comprises hydrogen, carbon monoxide, carbon dioxide, and methane and is substantially-free of halogenated organic compounds;
    separating hydrogen from the Clean Fuel Gas; and
    reacting the separated hydrogen with nitrogen (N$_2$) to produce ammonia (NH$_3$),
    wherein the waste source comprises a treated wood waste source that includes at least one of railroad ties, cross ties, RR crossing roadways, telephone poles, utility poles, cross arm members, bridge timbers, decking, walkways, dock timbers and wharf pilings, lake and ocean pier/pilings, landscaping timbers and edging, treated outdoor engineering structural and other reinforced wood composites, and/or other treated wood materials, and where the treated wood waste source comprises at least 20 wt-% chemical preservatives comprising one or more of creosote, chlorinated phenols, borates, copper, zinc, chromium or arsenic-containing preservatives.

2. The method of claim 1, wherein the waste source comprises electrical and electronic equipment waste that includes at least one of large household appliances, small household appliances, IT and telecommunications equipment, consumer equipment, lighting equipment, electrical and electronic tools, toys, leisure and sports equipment, medical devices, monitoring and control instruments, automatic dispensers, display equipment, refrigeration equipment, gas discharge lamps, photovoltaic panels, and/or other electronic waste materials.

3. The method of claim 1, wherein the waste source comprises carpet, rug, polymeric materials and other consumer waste products that include at least one of nylon, polypropylene (olefin), polytrimethylene terephthalate (PTT), polyester (PET), acrylic (or acetates), wool, other synthetic fibers, carpet adding, carpet fillers carpet backing materials, and/or non-carpet and/or rug polymeric materials that include at least one of polyethylene terephthalate (PETE or PET), high-density polyethylene (HDPE), polyvinyl chloride (PVC), low-density polyethylene (LDPE), polypropylene (PP), polystyrene (PS), Polycarbonate (PC), polylactide and combinations thereof.

4. The method of claim 1, wherein the toxic compounds in the waste source comprise pentachlorophenol (PCP), copper naphthenate, ammoniacal copper zinc arsenate, mixtures of coal tar oils, borate compounds, aromatic compounds, arsenic salts, nitrides or other salts, halogenated dibenzodioxins, halogenated dibenzofurans, biphenyls, pyrenes, arsenic, chlorofluorocarbons, or a combination thereof.

5. The method of claim 1, wherein the compounds destroyed comprise halogenated organic compounds, and wherein the method does not generate any toxic halogenated compounds in the process of converting the waste sources to the outputs.

6. The method of claim 1, wherein at least a portion of the Clean Fuel Gas generated is provided back to the thermolysis system as a fuel source.

7. The method of claim 6, wherein the Clean Fuel Gas comprises syngas that is a gas mixture that can be used to create a liquid biofuel.

8. The method of claim 7, wherein the Clean Fuel Gas source comprises at least about 15 wt-% hydrogen, or between about 15 wt-% to about 40 wt-% hydrogen.

9. The method of claim 8, wherein the separating of the hydrogen from the Clean Fuel Gas comprises a separation membrane, and optionally wherein the membrane separation is combined with a sorbent.

10. The method of claim 9, wherein the Clean Fuel Gas is pressurized before passing through a separation membrane.

11. The method of claim 1, wherein the separated hydrogen is a highly purified gas having at least about 95% hydrogen, at least about 96% hydrogen, at least about 97% hydrogen, at least about 98% hydrogen, or at least about 99% hydrogen.

12. The method of claim 1, wherein the reacting of the separated hydrogen with nitrogen is a Haber Bosch process.

13. The method of claim 1, wherein the nitrogen is extracted from the air through use of a nitrogen unit to provide nitrogen for the reaction to generate the green ammonia.

14. The method of claim 1, wherein the reacting of the hydrogen with nitrogen does not produce greenhouse gases.

15. The method of claim 1, wherein the ammonia is cooled to produce liquid ammonia.

16. The method of claim 4, wherein the Clean Fuel Gas, Char/Biochar produced contain less than about 10 ppb of toxic halogenated compounds and contain less than about 10 ppb of polycyclic aromatic hydrocarbons, dioxins and furans.

17. The method of claim 1, wherein the moisture content of the waste source is measured or the pressure in the reactor is measured and steam is injected into the reactor to increase moisture content of the waste source to about 5-20 wt-%, or the waste source is dried to decrease moisture content of the waste source to about 5-20 wt-%.

* * * * *